(12) United States Patent
Chang

(10) Patent No.: US 10,395,001 B2
(45) Date of Patent: Aug. 27, 2019

(54) MULTIPLE PATTERNING LAYOUT DECOMPOSITION CONSIDERING COMPLEX COLORING RULES

(71) Applicant: Synopsys, Inc., Mountain View, CA (US)

(72) Inventor: Hua-Yu Chang, New Taipei (TW)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 15/359,579

(22) Filed: Nov. 22, 2016

(65) Prior Publication Data

US 2017/0147740 A1    May 25, 2017

Related U.S. Application Data

(60) Provisional application No. 62/260,227, filed on Nov. 25, 2015.

(51) Int. Cl.
| | | |
|---|---|---|
| *G06F 17/50* | (2006.01) | |
| *G03F 1/70* | (2012.01) | |
| *G03F 7/20* | (2006.01) | |

(52) U.S. Cl.
CPC ............ *G06F 17/5081* (2013.01); *G03F 1/70* (2013.01); *G03F 7/70466* (2013.01); *G06F 17/5072* (2013.01); *G06F 2217/06* (2013.01)

(58) Field of Classification Search
CPC ............ G06F 17/5068; G06F 17/5072; G06F 17/5081; G06F 2217/06; G03F 1/70; G03F 7/70466
See application file for complete search history.

(56) References Cited

U.S. PATENT DOCUMENTS

| | | |
|---|---|---|
| 6,408,428 B1 | 6/2002 | Schlansker et al. |
| 6,421,809 B1 | 7/2002 | Wuytack et al. |
| 6,704,921 B2 | 3/2004 | Liu |
| 6,829,216 B1 | 12/2004 | Nakata |
| 7,049,589 B2 | 5/2006 | Yamaguchi et al. |
| 7,114,141 B1 | 9/2006 | Teig et al. |
| 7,560,201 B2 | 7/2009 | Liu |

(Continued)

FOREIGN PATENT DOCUMENTS

| | | |
|---|---|---|
| WO | WO 14/130783 A1 | 8/2014 |
| WO | WO 15/023856 A1 | 2/2015 |

OTHER PUBLICATIONS

EPO Application No. 14753896.1, Reply to the Opinion with the European Search Report dated Jun. 21, 2017.

(Continued)

*Primary Examiner* — Vuthe Siek
(74) *Attorney, Agent, or Firm* — Alston & Bird LLP

(57) ABSTRACT

A computer implemented method for decomposing a layout of a portion of an integrated circuit is presented. The layout includes a first multitude of polygons. The method includes constructing, using the computer, a first matrix representative of a first multitude of constraints. Each of the first multitude of constraints is between a different pair of the first multitude of polygons. The method includes solving, using the computer, the first matrix to thereby assign one of a multitude of masks to each different one of the first multitude of polygons, when the computer is invoked to decompose the layout.

48 Claims, 14 Drawing Sheets

(56) References Cited

U.S. PATENT DOCUMENTS

| | | | |
|---|---|---|---|
| 7,647,212 B2 | 1/2010 | Andreoli et al. | |
| 7,653,892 B1 | 1/2010 | Gennari et al. | |
| 8,069,423 B2 | 11/2011 | Ghan et al. | |
| 8,190,547 B2 | 5/2012 | Kirovski | |
| 8,209,656 B1 | 6/2012 | Wang et al. | |
| 8,312,394 B2 | 11/2012 | Ban et al. | |
| 8,316,329 B1 | 11/2012 | Rigby et al. | |
| 8,327,299 B1 | 12/2012 | Gennari et al. | |
| 8,359,556 B1 | 1/2013 | Ghaida et al. | |
| 8,402,396 B2 | 3/2013 | Kahng et al. | |
| 8,434,043 B1 | 4/2013 | Hsu et al. | |
| 8,448,100 B1 | 5/2013 | Lin et al. | |
| 8,473,873 B2 | 6/2013 | Hsu et al. | |
| 8,484,607 B1 | 7/2013 | Tang et al. | |
| 8,515,724 B2 | 8/2013 | Joshi et al. | |
| 8,516,403 B2 | 8/2013 | Abou Ghaida et al. | |
| 8,601,409 B1* | 12/2013 | Chen | G06F 17/50 716/54 |
| 8,661,371 B1 | 2/2014 | Wang | |
| 8,677,297 B2 | 3/2014 | Chase et al. | |
| 8,751,974 B2 | 6/2014 | Kahng et al. | |
| 8,875,065 B1 | 10/2014 | Lin et al. | |
| 9,141,752 B2 | 9/2015 | Lin et al. | |
| 9,158,885 B1* | 10/2015 | Gray | G03F 7/70433 |
| 9,298,084 B2 | 3/2016 | Luo | |
| 9,360,750 B2 | 6/2016 | Lin et al. | |
| 9,384,319 B2 | 7/2016 | Cilingir et al. | |
| 9,740,814 B1 | 8/2017 | Ghosh | |
| 9,904,756 B1 | 2/2018 | Ruehl et al. | |
| 2009/0070550 A1 | 3/2009 | Solomon | |
| 2010/0050146 A1 | 2/2010 | Frankle et al. | |
| 2010/0064269 A1 | 3/2010 | Lai et al. | |
| 2011/0014876 A1 | 1/2011 | Sezginer et al. | |
| 2011/0052088 A1 | 3/2011 | Yuan et al. | |
| 2011/0078638 A1 | 3/2011 | Kahng et al. | |
| 2011/0197168 A1* | 8/2011 | Chen | G06F 17/5081 716/50 |
| 2011/0284996 A1 | 11/2011 | Kurusu et al. | |
| 2013/0007674 A1 | 1/2013 | Abou Ghaida et al. | |
| 2013/0024822 A1 | 1/2013 | Hsieh et al. | |
| 2013/0036397 A1 | 2/2013 | Lee et al. | |
| 2013/0061183 A1 | 3/2013 | Abou Ghaida et al. | |
| 2013/0061185 A1 | 3/2013 | Abou Ghaida et al. | |
| 2013/0074018 A1 | 3/2013 | Hsu et al. | |
| 2013/0174106 A1 | 7/2013 | Hsu et al. | |
| 2014/0007026 A1 | 1/2014 | Chen et al. | |
| 2014/0053118 A1 | 2/2014 | Chen et al. | |
| 2014/0189611 A1 | 7/2014 | Lai et al. | |
| 2014/0244215 A1 | 8/2014 | Nakayama et al. | |
| 2014/0245237 A1 | 8/2014 | Cilingir et al. | |
| 2014/0282293 A1 | 9/2014 | Lin et al. | |
| 2014/0372958 A1 | 12/2014 | Lin et al. | |
| 2015/0040077 A1 | 2/2015 | Ho et al. | |
| 2015/0234974 A1 | 8/2015 | Dechene et al. | |
| 2015/0286771 A1 | 10/2015 | Choi et al. | |
| 2017/0004251 A1 | 1/2017 | Cilingir et al. | |
| 2017/0124242 A1 | 5/2017 | Sharma et al. | |
| 2017/0206300 A1 | 7/2017 | Xue et al. | |
| 2017/0336707 A1 | 11/2017 | Choi et al. | |

OTHER PUBLICATIONS

U.S. Appl. No. 14/185,717, Non-Final Office Action dated Aug. 15, 2017.

U.S. Appl. No. 14/678,831, Notice of Allowance dated Jul. 12, 2017.

U.S. Appl. No. 14/996,796, Non-Final Office Action dated Aug. 22, 2017.

U.S. Appl. No. 15/179,890, Non-Final Office Action dated Oct. 4, 2017.

Beigel et al., "3-Coloring in Time 0(1.3289")," Journal of Algorithms, 54:168-204, (2005).

Dorigo et al., "An Introduction to Ant Colony Optimization," Universite Libre de Bruxelles Institut de Recherches Interdisciplinaires et de Developpements en Intelligence Artificielle (IRIDIA) Technical Report No. TR/IRIDIA/2006-010, 22 pages, (2006).

Fang et al., "A novel layout decomposition algorithm for triple patterning lithography," in IEEE Trans. on Computer-Aided Design of Integrated Circuits and Systems (TCAD), 33(3),:397-408, (2014).

Fister et al., "Using differential evolution for the graph coloring," Differential Evolution (SDE), IEEE, Symposium on Apr. 11, 2011, pp. 1-7, doi: 10.1109/SDE.2011.5952075, (2011).

Galinier et al.; "Hybrid Evolutionary Algorithms for Graph Coloring" Journal of Combinatorial Optimization, Kluwer Academic Publishers, pp. 1-33, (1999).

Grosan et al., "Hybrid Evolutionary Algorithms: Methodologies, Architectures, and Reviews," Studies in Computational Intelligence (SCI), 75:1-17, (2007).

Kuang et al., "An Efficient Layout Decomposition Approach for Triple Patterning Lithography," In: Design Automation Conference (DAC) 2013, pp. 1-6, (2013).

Li et al., "14nm M1 Triple Patterning," Proceedings of the International Society for Optics and Photonics (SPIE), 8326:832612-1-832612-7, (2012).

Tian et al., "A polynomial time triple patterning algorithm for cell based row-structure layout," Computer-Aided Design, pp. 57-64, doi: 10.1145/2429384.2429396 (2012).

Yu et al., "Layout Decomposition for Triple Patterning Lithography," 2011 Institute of Electrical and Electronics Engineers/Association for Computing Machinery International Conference on Computer-Aided Design (ICCAD), pp. 1-8, (2011).

EPO Application No. 14753896.1, European Search Report and European Search Opinion dated Dec. 20, 2016.

Taiwanese Application No. 103105938, First Office Action dated Jun. 5, 2015.

Taiwanese Application No. 103105938, Second Office Action dated Oct. 5, 2015.

U.S. Appl. No. 14/185,717, Final Office Action dated Jan. 13, 2017.

U.S. Appl. No. 14/185,717, Non-Final Office Action dated Apr. 5, 2016.

U.S. Appl. No. 14/459,657, Non-Final Office Action dated Oct. 7, 2015.

U.S. Appl. No. 14/459,657, Notice of Allowance dated Mar. 11, 2016.

U.S. Appl. No. 14/678,831, Final Office Action dated Dec. 23, 2016.

U.S. Appl. No. 14/678,831, Non-Final Office Action dated Apr. 27, 2016.

U.S. Appl. No. 15/179,890, Non-Final Office Action dated Mar. 13, 2017.

WIPO Application No. PCT/US2014/017619, PCT International Preliminary Report on Patentability dated Aug. 25, 2015.

WIPO Application No. PCT/US2014/017619, PCT International Search Report dated May 30, 2014.

WIPO Application No. PCT/US2014/017619, PCT Written Opinion of the International Searching Authority dated May 30, 2014.

WIPO Application No. PCT/US2014/051086, PCT International Preliminary Report on Patentability dated Feb. 15, 2016.

WIPO Application No. PCT/US2014/051086, PCT International Search Report dated Nov. 25, 2014.

WIPO Application No. PCT/US2014/051086, PCT Written Opinion of the International Searching Authority dated Nov. 25, 2014.

U.S. Appl. No. 61/768,365, filed Feb. 22, 2013.
U.S. Appl. No. 61/866,516, filed Aug. 15, 2013.
U.S. Appl. No. 14/185,717, filed Feb. 20, 2014.
PCT/US2014/017619, filed Feb. 21, 2014.
U.S. Appl. No. 61/975,701, filed Apr. 4, 2014.
U.S. Appl. No. 14/459,657, filed Aug. 14, 2014.
PCT/US2014/051086, filed Aug. 14, 2014.
U.S. Appl. No. 14/678,831, filed Apr. 3, 2015.
U.S. Appl. No. 14/929,113, filed Oct. 30, 2015.
U.S. Appl. No. 62/260,227, filed Nov. 25, 2015.
U.S. Appl. No. 14/996,796, filed Jan. 15, 2016.
U.S. Appl. No. 15/179,890, filed Jun. 10, 2016.
Knuth, "Dancing Links," arxiv.org, Cornell University Library, arXiv:cs/0011047 [cs.DS], 26 pages, (2000).

(56) References Cited

OTHER PUBLICATIONS

EPO Application No. 16200435.2 (Published as EP3193271), European Search Report and European Search Opinion dated Jun. 21, 2017.
U.S. Appl. No. 14/929,113, Non-Final Office Action dated Jun. 2, 2017.
U.S. Appl. No. 14/185,717, Final Office Action dated May 11, 2018.
U.S. Appl. No. 14/929,113, Final Office Action dated Feb. 14, 2018.
U.S. Appl. No. 14/929,113, Non-Final Office Action dated Aug. 9, 2018.
U.S. Appl. No. 14/996,796, Final Office Action dated May 3, 2018.
U.S. Appl. No. 15/179,890, Notice of Allowance dated May 10, 2018.
U.S. Appl. No. 15/179,890, Notice of Allowance dated Sep. 12, 2018.
U.S. Appl. No. 15/669,502, Non-Final Office Action dated Dec. 26, 2017.
U.S. Appl. No. 15/669,502, Notice of Allowance dated Aug. 16, 2018.
U.S. Appl. No. 14/185,717, Non-Final Office Action dated Oct. 11, 2018.
U.S. Appl. No. 14/996,796, Non-Final Office Action dated Nov. 16, 2018.
U.S. Appl. No. 15/179,890, Non-Final Office Action dated Jan. 4, 2019.
U.S. Appl. No. 15/669,502, Notice of Allowance dated Jan. 15, 2019.

* cited by examiner

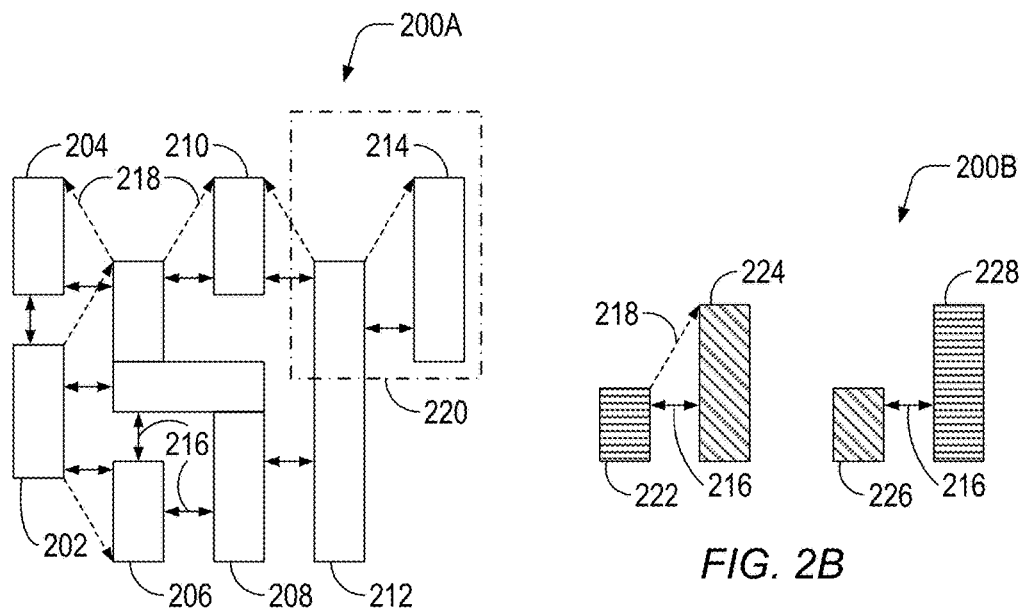
FIG. 2A
FIG. 2B
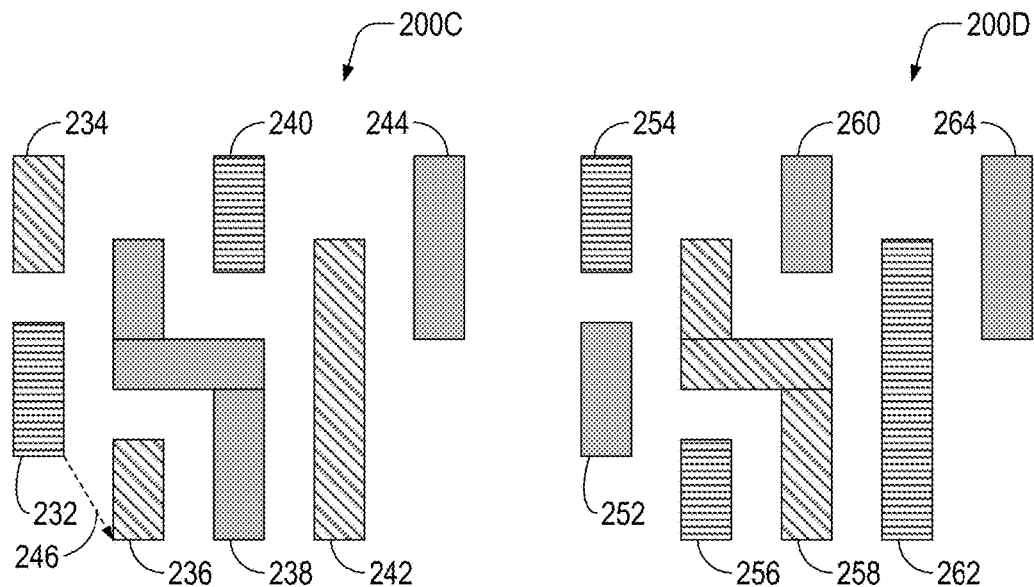
FIG. 2C
FIG. 2D

MULTIPLE PATTERNING LAYOUT DECOMPOSITION CONSIDERING COMPLEX COLORING RULES

CROSS-REFERENCES TO RELATED APPLICATIONS

This application claims priority, under 35 U.S.C. § 119(e), from U.S. Provisional Application No. 62/260,227, filed on Nov. 25, 2015, entitled "MULTIPLE PATTERNING LAYOUT DECOMPOSITION CONSIDERING COMPLEX COLORING RULES", the contents of all of which is incorporated herein by reference in its entirety.

BACKGROUND

The present invention relates to electronic design automation (EDA), and more particularly, to techniques for decomposing a layout of an integrated circuit (IC) into a multitude of masks of a multiple-patterning lithography process.

As the feature size of semiconductor technology continues shrinking, multiple patterning lithography (MPL) has been considered one of solution candidates to overcome the resolution limit of conventional optical lithography, along with four next generation lithography techniques—extreme ultraviolet lithography, directed self-assembly, nanoimprint lithography, and electron beam lithography. MPL may extend 193 nm immersion lithography to sub-14 nm nodes by performing a series of exposure/etching steps to pattern a layer of the IC using a multitude of masks derived from a layout represented by a set of polygonal features to be printed on the layer. MPL thereby improves the effective pitch and the lithography resolution compared to a lithography process using just a single mask. One challenge of MPL is layout decomposition, where a layout is divided into several masks.

MPL includes double patterning lithography (DPL), triple patterning lithography (TPL), quadruple patterning lithography (QPL), and so on. Thus far, existing works focus on only the basic coloring rule, i.e. the same color spacing constraint $c_s$, and model this version of multiple patterning layout decomposition (MPLD) as a graph coloring problem on a conflict graph. Even this version of MPLD is difficult because graph coloring on a general graph is computationally hard. The simplest form of MPL is DPL. The double patterning layout decomposition problem corresponds to a two-coloring problem. A conflict graph without odd cycles is two-colorable. Hence, testing two-colorability and two-coloring a conflict graph can be done in linear time by breadth-first search techniques.

TPL, which is a natural extension of DPL, decomposes a layout into three masks instead of two and thus can handle more dense and complex layouts with fewer stitches and conflicts. However, triple patterning layout decomposition turns out to be a hard problem because testing three-colorability of a graph and three-coloring a three-colorable graph are both NP-complete. Compared with TPL, QPL adds one more mask, which is modeled as a four-coloring problem. As more masks are used as technology advances, the conflict graph becomes denser, and as more complex coloring rules are introduced, thus MPLD becomes even more challenging.

Recently, there have been extensive researches on MLB decomposition described using different numbers of masks. For DPL that uses two masks, a min-cut-based polynomial time algorithm has been presented which delivers the most up-to-date results. For TPL and QPL, prior works mainly fall into two categories: mathematical programming and fast heuristics. The mathematical programming approach, e.g., integer linear programming (ILP) and semidefinite programming (SDP), seeks optimality but may consume long computer runtime that may require speedup techniques. Fast heuristics, e.g., lookup table, pairwise coloring, and modified independent set techniques, are usually efficient but may lose some solution quality and produce some false coloring conflicts. So far, all of these methods are developed to resolve graph coloring corresponding to complying with a single basic coloring rule and model multiple patterning layout decomposition as a graph coloring problem. However, multiple patterning layout decomposition with more complex coloring rules, such as when more than one coloring rule is required, is not just a conventional graph coloring problem, and thus these methods cannot easily be extended to handle the complex coloring rules.

Accordingly, there is a need to be able to decompose a layout for MLP that comprehends complex coloring rules using triple or higher patterning lithography technology.

SUMMARY

According to one embodiment of the present invention, a computer implemented method for decomposing a layout of a portion of an integrated circuit is presented. The layout includes a first multitude of polygons. The method includes constructing, using the computer, a first matrix representative of a first multitude of constraints. Each of the first multitude of constraints is between a different pair of the first multitude of polygons. The method includes solving, using the computer, the first matrix to thereby assign one of a multitude of masks to each different one of the first multitude of polygons, when the computer is invoked to decompose the layout.

According to one embodiment, each one of the multitude of masks is associated with multiple patterning lithography. According to one embodiment, each one of the first multitude of constraints causes the pair of the first multitude of polygons to be assigned to different ones of the multitude of masks.

According to one embodiment, the layout includes a second multitude of polygons. The method further includes constructing, using the computer, the first matrix representative of a second multitude of constraints, each one of the second multitude of constraints being different from any one of the first multitude of constraints. Each one of the second multitude of constraints causes a pair of the second multitude of polygons to be assigned to different ones of the multitude of masks.

According to one embodiment, the first matrix is an exact cover matrix. According to one embodiment, the first matrix is characterized by dimension equal to the sum of a first number and a second number. The first number is equal to a first count of the first multitude of polygons multiplied by a second count of the multitude of masks. The second number is equal to a third count of the first multitude of constraints multiplied by the second count.

According to one embodiment, the first matrix characterized by a dimension equal to an integer value equal to the sum of a first number and a second number. The first number is equal to a first count of the first multitude of polygons. The second number is equal to a second count of the first multitude of constraints multiplied by a third count of the multitude of masks.

According to one embodiment, the first matrix includes a first multitude of rows and a multitude of columns having a different orientation to the first multitude of rows. One of a multitude of values is associated with an intersection between one of the first multitude of rows and one of the multitude of columns. Each of the multitude of values is a logical true value. Constructing the first matrix includes constructing a second multitude of rows. The second multitude of rows is a subset of the first multitude of rows such that each one of the second multitude of rows contains exactly one logical true value in each one of the multitude of columns. According to one embodiment, the method further includes representing, using the computer, the first matrix as a Dancing Links data structure to solve the first matrix.

According to one embodiment, the method further includes forming, using the computer, data representative of a graph associated with the layout. The graph includes a multitude of vertices and a multitude of edges. Each one of the multitude of vertices is associated with a different one of the first multitude of polygons. Each one of the multitude of edges is associated with a different one of the first multitude of constraints. The method further includes transforming, using the computer, the graph into the first matrix. The first matrix includes a first multitude of columns. Each one of the first multitude of columns is associated with a different one of the first multitude of polygons. The method further includes visiting, using the computer, the first multitude of columns in a breadth-first search order associated with the graph to solve the first matrix.

According to one embodiment, the first matrix includes a first multitude of rows and a multitude of columns having a different orientation to the first multitude of rows. One of a multitude of values is associated with an intersection between one of the first multitude of rows and one of the multitude of columns. Each one of the multitude of values is a logical true value. The method further includes first choosing, using the computer, one of the first multitude of columns having exactly one logical true value at the intersection of the chosen one of the first multitude of columns and one of the first multitude of rows to solve the first matrix.

According to one embodiment, the method further includes detecting, using the computer, a first conflict when solving the first matrix provides no feasible solution. The first conflict is one of the first multitude of constraints that prevents assigning one of the multitude of masks to one of the first multitude of polygons. The method further includes removing, using the computer, a representation of the first conflict from the first matrix thereby forming a second matrix if the first conflict is detected. The method further includes marking, using the computer, the detected first conflict as an exact first conflict and continuing, using the computer, to solve the second matrix thereby avoiding starting from scratch. The method further includes detecting, using the computer, a second conflict when solving the second matrix provides no feasible solution. The second conflict is one of the first multitude of constraints that prevents assigning one of the multitude of masks to one of the first multitude of polygons.

According to one embodiment, the method further includes stitching, using the computer, at least one of the first multitude of polygons to form a second multitude of polygons when solving the first matrix provides no feasible solution. The method further includes constructing, using the computer, a second matrix representative of the first multitude of constraints and a second multitude of constraints. Each of the first multitude of constraints is between a different pair of the first multitude of polygons. Each of the second multitude of constraints is between a different pair of the second multitude of polygons. The method further includes solving, using the computer, the second matrix to thereby assign one of a multitude of masks to each different one of the first multitude of polygons and to each different one of the second multitude of polygons. According to one embodiment, a count of the multitude of masks is greater than or equal to 3.

According to one embodiment, the first multitude of polygons includes a first polygon, a second polygon, and a third polygon. Constructing the first matrix further includes associating the first polygon with a first column of the matrix, associating the second polygon with a second column of the matrix, and associating the third polygon with a third column of the matrix.

According to one embodiment, the first multitude of constraints includes a first constraint between the first polygon and the second polygon, and a second constraint between the first polygon and the third polygon. Constructing the first matrix further includes associating a first multitude of columns of the matrix with the first constraint. Each one of the first multitude of columns is further associated with a different one of the multitude of masks. Constructing the first matrix further includes associating a second multitude of columns of the matrix with the second constraint. Each one of the second multitude of columns is further associated with the different one of the multitude of masks.

According to one embodiment, constructing the first matrix further includes associating a first multitude of rows of the matrix with the first polygon. Each one of the first multitude of rows is further associated with a different one of the multitude of masks. Constructing the first matrix further includes associating a second multitude of rows of the matrix with the second polygon. Each one of the second multitude of rows is further associated with the different one of the multitude of masks. Constructing the first matrix further includes associating a third multitude of rows of the matrix with the third polygon. Each one of the third multitude of rows is further associated with the different one of the multitude of masks. Constructing the first matrix further includes associating a fourth multitude of rows of the matrix with the first constraint. Each one of the fourth multitude of rows is further associated with the different one of the multitude of masks. Constructing the first matrix further includes associating a fifth multitude of rows of the matrix with the second constraint. Each one of the fifth multitude of rows is further associated with the different one of the multitude of masks.

According to one embodiment, a third multitude of columns includes the first column, the second column, the third column, the first multitude of columns, and the second multitude of columns. A sixth multitude of rows includes the first, second, third, fourth, and fifth multitude of rows. Constructing the first matrix further includes associating a logical true value at each intersection between one of the sixth multitude of rows and one of the third multitude of columns when the association between one of the sixth multitude of rows and one of the third multitude of columns is true.

According to one embodiment of the present invention, a non-transitory computer-readable storage medium comprising instructions which when executed by a computer cause the computer to construct a first matrix representative of a first multitude of constraints. Each of the first multitude of constraints is between a different pair of a first multitude of polygons that are included in a layout of a portion of an integrated circuit. The instructions further cause the computer to solve the first matrix to thereby assign one of a multitude of masks to each different one of the first multitude of polygons, when the computer is invoked to decompose the layout.

According to one embodiment of the present invention, a system for decomposing a layout of a portion of an integrated circuit is presented. The layout includes a first multitude of polygons. The system is configured to construct a first matrix representative of a first multitude of constraints. Each of the first multitude of constraints is between a different pair of the first multitude of polygons. The system is further configured to solve the first matrix to thereby assign one of a multitude of masks to each different one of the first multitude of polygons, when the system is invoked to decompose the layout.

A better understanding of the nature and advantages of the embodiments of the present invention may be gained with reference to the following detailed description and the accompanying drawings.

BRIEF DESCRIPTION OF THE DRAWINGS

FIG. 2A depicts a simplified exemplary layout including a multitude of polygons before color decomposition.

FIG. 2B depicts a simplified exemplary layout 200B including a pair of polygons demonstrating a different color spacing constraint after two different MPL coloring decompositions.

FIG. 2C depicts a simplified exemplary layout after a first multiple patterning decomposition of the layout previously depicted in FIG. 2A with a resulting coloring conflict.

FIG. 2D depicts a simplified exemplary layout after a second multiple patterning decomposition of the layout previously depicted in FIG. 2A that is a conflict free decomposition solution.

DETAILED DESCRIPTION

Figure 1:
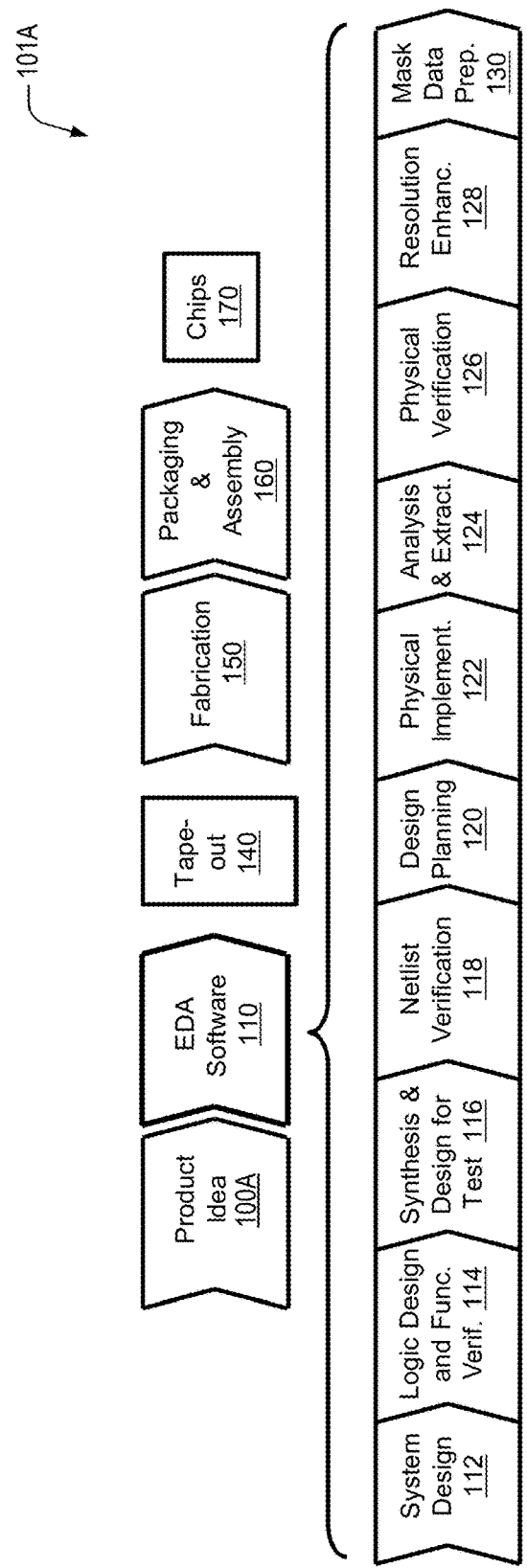
FIG. 1 depicts simplified exemplary steps in the design and fabrication of an integrated circuit.

FIG. 1 depicts simplified exemplary steps in the design and fabrication of an integrated circuit. The process starts with a product idea 100, which is realized using Electronic Design Automation (EDA) software 110. Chips 170 can be produced from the finalized design by performing fabrication 150 and packaging and assembly 160 steps. An exemplary design flow that uses EDA software 110 is described below for illustration purposes only. For example, an actual integrated circuit design may require a designer to perform the design flow steps in a different sequence than the sequence described below.

In the system design 112, a designer describes the functionality to be implemented. The designer can also perform what-if planning to refine the functionality and to check costs. Further, hardware-software architecture partitioning can occur at this step. In the design and functional verification 114, a Hardware Description Language (HDL) design may be created and checked for functional accuracy.

In the synthesis and design 116, the HDL code can be translated to a netlist, which can be optimized for the target technology. Further, tests can be designed and implemented to check the finished chips. In the netlist verification 118, the netlist can be checked for compliance with timing constraints and for correspondence with the HDL code. In the design planning 120, an overall floor plan for the chip can be constructed and analyzed for timing and top-level routing. Next, in the physical implementation 122, placement and routing can be performed.

In the analysis and extraction 124, the circuit functionality can be verified at a transistor level. In the physical verification 126, the design can be checked to correct any functional, manufacturing, electrical, or lithographic issues. In the resolution enhancement 128, geometric manipulations can be performed on the layout to improve manufacturability of the design. Finally, in the mask data preparation 130, the design can be taped-out 140 for production of masks to produce finished chips. The embodiments of the present invention may be used, for example at the steps of either physical verification 126 and/or mask data preparation 130.

One challenge of MPL is layout decomposition, where a layout is divided into several masks. For typical MPL, when the distance between two features, hereinafter also referred to as "polygons", or pair of polygons of the layout is less than a same color spacing constraint $c_s$, the features should be assigned to different masks (colors) to avoid a coloring conflict. Sometimes a coloring conflict can be resolved by splitting a feature into two touching parts, hereinafter also referred to as "stitching".

A stitch may be formed by first cutting a portion of a polygon without changing the original outline of the polygon, and then reassigning the cut portion of the polygon to a different color than the original polygon such that the coloring conflict is fixed without introducing other coloring conflicts. The resulting outline of the original polygon may be preserved as a combination of the two differently colored polygons overlapping one another over a predetermined or proscribed length in accordance with the design rules where the two polygons are overlapped.

However, this splitting that induces stitches may lead to potential yield loss due to overlay error. Therefore, one objective in layout decomposition is to minimize the numbers of conflicts and stitches. Moreover, as the technology node advances, more complex coloring rules are introduced. In addition to the same color spacing constraint ($c_s$), the distance between ends of different features may be subject to different color spacing constraints ($c_d^{ij}$), where ij represents a constraint from mask (color) i to a different mask (color) j.

FIG. 2A depicts a simplified exemplary layout 200A including a multitude of polygons a, b, c, d, e, f, and g corresponding to elements labeled respectively as 202, 204, 206, 208, 210, 212, and 214 before color decomposition. A multitude of same color spacing constraint ($c_s$) 216 are depicted by solid lines between some of the multitude of polygons. A multitude of different color spacing constraints ($c_d^{ij}$) 218 are depicted by dashed lines between some of the multitude of polygons. It is noted that the polygons are not yet colored as depicted by the lack of any fill patterns within the polygons. Decomposition of layout 200A will be in accordance with; the multitude of same color spacing constraints ($c_s$) 216, the multitude of different color spacing constraints ($c_d^{ij}$) 218, and the embodiments as described below.

FIG. 2B depicts a simplified exemplary layout 200B including a pair of polygons demonstrating a different color spacing constraints ($c_d^{ij}$) 218 after two different MPL coloring decompositions. The same color spacing constraint ($c_s$) 216 exists between the pair of polygons necessitating each polygon in the pair be assigned to different masks, i.e. colored differently. For example, the pair of polygons may be selected as a portion 220 of layout 200A depicted in FIG. 2A.

The coloring decomposition depicted at the left of FIG. 2B includes pair of polygons 222, 224 where polygon 222 is assigned to or colored as a mask 1 depicted by horizontal stripe fill pattern and where polygon 224 is assigned to or colored as a mask 2 depicted by diagonal stripe fill pattern. According to different color spacing constraint ($c_d^{ij}$) 218, since feature or polygon 222 is assigned to mask 1, then the keep-out zone of its end should not include any ends of other features that are assigned to mask 2 such as polygon 224 in accordance with $c_d^{12}$.

The different coloring decomposition depicted at the right of FIG. 2B includes pair of polygons 226, 228, which before coloring corresponded respectively to polygons 222, 224, where polygon 226 is instead assigned to mask 2 and where polygon 226 is instead assigned to mask 1. The different color spacing constraints may not be symmetric with regards to mask order. Therefore, no different color spacing constraint ($c_d^{ij}$) 218 exists between pair of polygons 226, 228 because in this example, $c_d^{12}$ checks only from the first mask to the second one.

FIG. 2C depicts a simplified exemplary layout 200C after a first multiple patterning decomposition of the layout 200A previously depicted in FIG. 2A with a resulting coloring conflict 246. Layout 200C includes polygons 232, 234, 236, 238, 240, 242, 244 after being assigned respectively to mask 1, mask 2, mask 2, mask 3, mask 1, mask 2, and mask 3. Mask 3 assignments are depicted as solid grey fill pattern. Layout 200C decomposition may be a result generated by existing methods, where a conflict 246 to the different color spacing constraint $c_d^{12}$ occurs between features a and c, i.e. between polygons 232 and 236. Even if color flipping is performed, conflict 246 still cannot be fixed.

FIG. 2D depicts a simplified exemplary layout 200D after a second multiple patterning decomposition of the layout 200A previously depicted in FIG. 2A that is a conflict free decomposition solution. Layout 200D includes polygons 252, 254, 256, 258, 260, 262, 264 after being assigned respectively to mask 3, mask 1, mask 1, mask 2, mask 3, mask 1, mask 3.

Furthermore, some features or polygons may be sensitive to mask misalignment, and thus a pre-coloring or partial coloring constraint restricts these features to the same mask (color). Sometimes, the pre-coloring constraint is assigned with a specific mask (color). These complex coloring rules further complicate the layout decomposition process.

In accordance with one embodiment of the present invention, techniques are provided for layout decomposition with complex coloring rules, modeling the multiple patterning layout decomposition problem as an exact cover problem. In one embodiment, a fast/exact multiple patterning layout decomposition framework or technique is presented based on augmented Dancing Links. The framework is flexible and general by considering the basic coloring rule and complex coloring rules simultaneously, and also handles quadruple patterning and beyond. Experimental results show that using these embodiments outperforms state-of-the-art works on reported conflicts and stitches, while handling complex coloring rules as well.

The Multiple Patterning Layout Decomposition Problem may be described as follows. Given a routed layout represented by a set of polygonal features, the number k of masks to be used, the minimum same color spacing $c_s$, a set of minimum different color spacings $\{c_d^{12}, \ldots, c_d^{ij}, \ldots\}$, i,j $\in \{1, \ldots, k\}$, pre-coloring constraints, the minimum feature size $f_s$, and the overlay margin, the goal is to assign one mask out of k for each feature so that the numbers of conflicts and stitches are minimized.

The reduction from MPLD with the same color spacing constraint ($c_s$) to exact cover is demonstrated next. Later, it will show how exact cover handles complex coloring rules. MPLD with the basic coloring rule may be modeled as graph coloring on a conflict graph, where a vertex represents a feature, while an edge connects two vertices if they violate the same color spacing constraint.

Figure 3A:
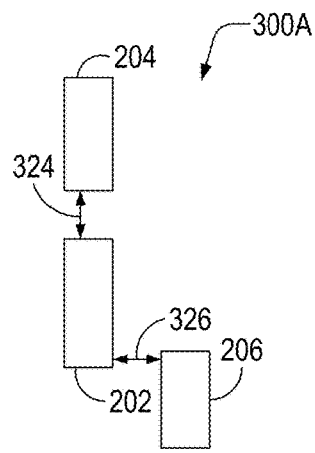
FIG. 3A depicts a simplified exemplary portion of the layout previously depicted in FIG. 2A.

FIG. 3A depicts a simplified exemplary portion 300A of layout 200A previously depicted in FIG. 2A. Portion 300A includes a multitude of polygons 202, 204, 206 that were previously described in reference to FIG. 2A and also respectively called a, b, c. In FIG. 3A, portion 300A further includes two instances of same color spacing constraint ($c_s$). One instance of same color spacing constraint ($c_s$) 324 is depicted between polygons 202, 204, while a second instance of same color spacing constraint ($c_s$) 326 is depicted between polygons 202, 206.

Figure 3B:
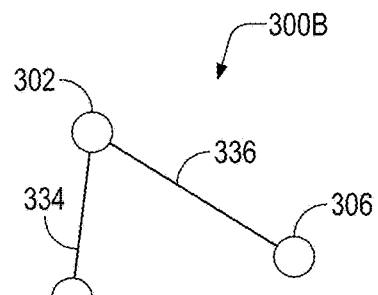
FIG. 3B depicts a simplified exemplary construction of a conflict graph including vertices associated respectively with the polygons previously depicted in FIG. 3A, in accordance with one embodiment of the present invention.

FIG. 3B depicts a simplified exemplary construction of a conflict graph G 300B including vertices 302, 304, 306 associated respectively with the polygons 202, 204, 206 previously depicted in FIG. 3A, in accordance with one embodiment of the present invention. Conflict graph G 300B further includes a multitude of edges 334, 336 associated respectively with the two instances of same color spacing constraint ($c_s$) 324, 326 depicted previously in FIG. 3A and which may also be respectively designated as $\{a, b\}$, $\{a, c\}$ or simply as ab, ac.

The graph coloring problem associated with the same color spacing constraint ($c_s$) may be described as follows. Given a graph G=(V, E) and the number k of colors, is there a way to assign the vertices with k colors such that no two adjacent vertices share the same color? V is the set of vertices and E is the set of edges in the graph. According to embodiments of this invention, the layout decomposition problem may be modeled as an exact cover problem. The exact cover problem may be described as follows. Given a matrix of 0s and 1s, does the matrix have a set of rows containing exactly one "1" in each column?

For the exact cover problem, the columns of the matrix may be viewed as elements of a universe U, and the rows as subsets S of the universe. Then, the problem is to cover the universe with disjoint subsets S'⊆S. Graph coloring can be polynomially reduced to exact cover and the corresponding matrix is constructed as described below.

Figure 4:
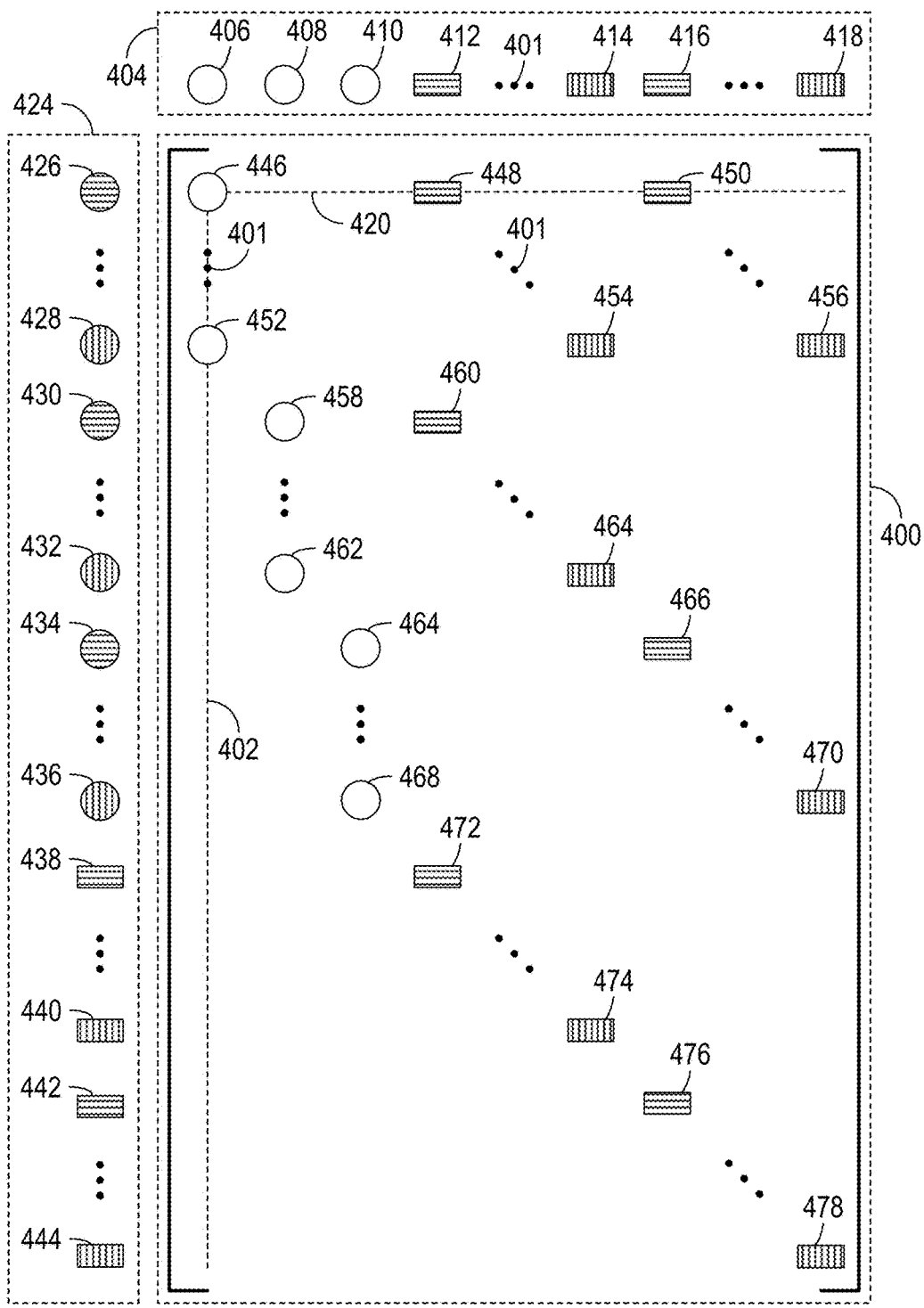
FIG. 4 depicts a simplified exemplary matrix demonstrating the reduction from MPLD of the conflict graph previously depicted in FIG. 3B with the basic coloring rule to exact cover, in accordance with one embodiment of the present invention.

FIG. 4 depicts a simplified exemplary matrix M 400 demonstrating the reduction from MPLD of conflict graph G 300B previously depicted in FIG. 3B with the same color spacing constraint ($c_s$) to exact cover, in accordance with one embodiment of the present invention. Matrix M 400 includes a multitude of columns 402 (elements in U) represented symbolically or labelled above matrix M 400 in box 404, each of the multitude of elements in box 404 associated with a corresponding different column in matrix M 400.

Multitude of columns 402 are constructed as follows. For each vertex v ∈ V, one corresponding element v in U is created. Accordingly, columns 406, 408, 410 depicted in box 404 are respectively associated with the multitude of vertices 302, 304, 306 depicted in FIG. 3B.

FIG. 4 further depicts, for each edge $\{u, v\} \in E$, k elements are created in U. Therefore, element $\{u, v\}^c$ is created for every available color c ∈ $\{1, \ldots, k\}$. Accordingly, columns 412 through 414 that are depicted in box 404 are respectively associated with edge 334 or $\{a, b\}$ previously depicted in FIG. 3B, where column 412 represents $ab^1$ associated with mask (color) 1 and column 414 represents $ab^k$ associated with mask (color) k. Mask color k is depicted as a pattern of vertical stripes. Intermediate elements 401 associated with the adjacent elements in the matrix are depicted as three small closely space black dots. Similarly, columns 416 through 418 that are depicted in box 404 are respectively associated with edge 336 or $\{a, c\}$ previously depicted in FIG. 3B, where column 416 represents $ac^1$ associated with mask (color) 1 and column 418 represents $ac^k$ associated with mask (color) k.

The total size of U is O(|V|+|E|). FIG. 4 depicts the total number of columns in matrix M 400 is (or is of a dimension) equal to an integer value equal to A+B, where A is equal to a count of the number of polygons (3 polygons in this example; a, b, c) in conflict graph G 300B, where B is equal to a count of the number of constraints (2 edges in this example; ab, ac) in conflict graph G 300B multiplied by k. Therefore, in this example the total number of columns is A+B=3+(2×k).

Matrix M 400 further includes a multitude of rows 420 (subsets S) represented symbolically or labelled to the left of matrix M 400 in box 424, each of the multitude of elements in box 424 associated with a corresponding different row in matrix M 400. Multitude of rows 420 are constructed as follows. The multitude of rows 420 are orthogonally disposed in relation to the multitude of columns 402. For each vertex v ∈ V, k sets belonging to S are created, where each set contains the element v and $\{u, v\}^c$ for each edge $\{u, v\}$ ∈ E for an available color c ∈ $\{1, \ldots, k\}$.

Accordingly, rows 426 through 428 that are depicted in box 424 are respectively associated with vertex 302 (vertex a) previously depicted in FIG. 3B. Further, row 426 is associated with assigning vertex 302 (vertex a) to mask (color) 1, and row 428 is associated with assigning vertex 302 (vertex a) to mask (color) k.

Similarly, rows 430 through 432 that are depicted in box 424 are respectively associated with vertex 304 (vertex b) previously depicted in FIG. 3B. Further, row 430 is associated with assigning vertex 304 (vertex b) to mask (color) 1, and row 432 is associated with assigning vertex 304 (vertex b) to mask (color) k. Accordingly, rows 434 through 436 that are depicted in box 424 are respectively associated with vertex 306 (vertex b) previously depicted in FIG. 3B. Further, row 434 is associated with assigning vertex 306 (vertex c) to mask (color) 1, and row 436 is associated with assigning vertex 306 (vertex c) to mask (color) k.

Matrix M 400 further includes, within each of the multitude of rows 420, entries that are logical is disposed at row/column intersections 446, 448, through 478 with the columns where there is a direct association defining the subsets of S for each row as described above. For example, intersection 446 of row 426 (vertex a with color 1) and column 406 associated with vertex a includes a 1. Similarly, intersection 448 of row 426 (vertex a with color 1) and column 412 associated with edge ab of color 1 includes a 1. Likewise, intersection 450 of row 426 (vertex a with color 1) and column 416 associated with edge ac of color 1 includes a 1. Similarly, intersection 452 of row 430 (vertex b with color 1) and column 408 associated with vertex b includes a 1 and so on for the multitude of rows 426 through 436 that are associated with colored vertices.

Matrix M 400 further includes singleton sets are added containing each individual element except for elements corresponding to vertices. Accordingly, matrix M 400 further includes a multitude of rows 438 through 444 labeled in box 424 the same as columns 412 through 418. Matrix M 400 further includes logical 1s disposed at intersections 472 through 478 as depicted. In one embodiment, matrix M 400 may further include logical 0s at all intersections not listed as described entries above.

The total size of all sets S is O(|V|+|E|). FIG. 4 depicts the total number of rows in matrix M 400 is (or is of a dimension) equal to an integer value equal to A+B, where A is equal to a count of the number of polygons (3 polygons in this example; a, b, c) in conflict graph G 300B multiplied by k, and where B is equal to a count of the number of constraints (2 edges in this example; ab, ac) in conflict graph G 300B multiplied by k. Therefore, in this example the total number of columns is A+B=(3×k)+(2×k)=5×k.

The validation of the above transformation from conflict graph 300B to matrix M 400 is that each edge $\{u, v\} \in E$ appears in both vertices u's and v's subsets for every possible color $c \in \{1, \ldots, k\}$, thus preventing u, v from being assigned to the same color. The singleton rows are used to ensure each element is covered.

Figure 5:
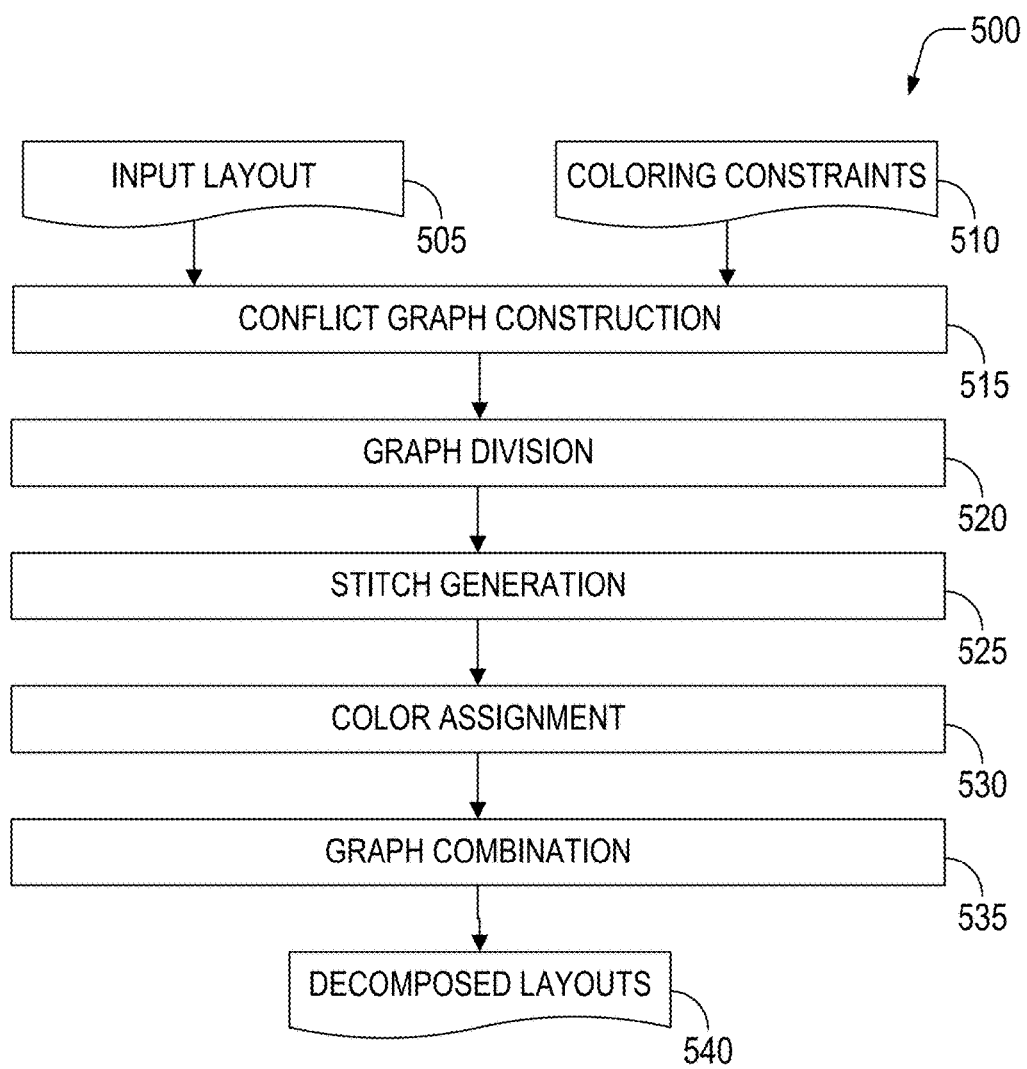
FIG. 5 depicts a simplified exemplary flow chart for multiple patterning layout decomposition, in accordance with one embodiment of the present invention.

FIG. 5 depicts a simplified exemplary flow chart 500 for multiple patterning layout decomposition, in accordance with one embodiment of the present invention. Flow chart 500 includes the following steps. Referring simultaneously to FIGS. 2A, 2D, 3A, 3B, first, conflict graph 300B is constructed 515 based on an input layout 505, such as for example layout 200A or layout 300A, and coloring constraints 510, such as for example the multitude of same color spacing constraints ($c_s$) 216 and the multitude of different color spacing constraints ($c_d^{ij}$) 218.

Conflict graph 300B to represent the MPLD problem is constructed as follows. Given a routed layout 300A composed of a set of polygonal features, e.g. polygons 202, 204, 206, the corresponding conflict graph $G=(V, E_s \cup E_d \cup E_p)$ is constructed, where each vertex 302, 304, 306, represents a corresponding feature, e.g. polygons 202, 204, 206 respectively. An undirected edge $\{u, v\} \in E_s$ exists if the distance between two corresponding features u and v is less than the minimum same color spacing $c_s$. In one embodiment, a directed edge $(u, v) \in E_d$ exists if the distance between features u and v violates the minimum different color spacing $c_d^{ij}$ for masks i, $j \in \{1, \ldots, k\}$. In another embodiment, a hyperedge $\{u, v, w, \ldots\} \in E_p$ exists if the corresponding features u, v, w, . . . are subject to a pre-coloring constraint (without or with a specified color/mask). Please note that in one embodiment more coloring rules may be included if necessary.

Second, the conflict graph is divided 520 and simplified to reduce the problem size. In one embodiment, four graph decomposition techniques may be incorporated to divide the constructed conflict graph: 1) connected component separation, 2) vertex removal if degree less than three, 3) bridge detection and removal, and 4) articulation point detection and duplication.

Color flipping is usually performed during subgraph combination. If color flipping is invalid (e.g., different color spacing constraint or pre-coloring constraint with a specified color), the last three techniques may induce extra conflicts during subgraph combination; in this case, only connected component separation may be applied.

Third, stitch candidates are generated 525 for subsequent conflict removal. Fourth, the coloring of each subgraph is determined 530. In one embodiment, vertex projection may be performed on the input layout to search all stitch candidates. Finally, the coloring results of subgraphs are combined 535 to produce the decomposed layout 540, such as for example layout 200D.

Figure 6:
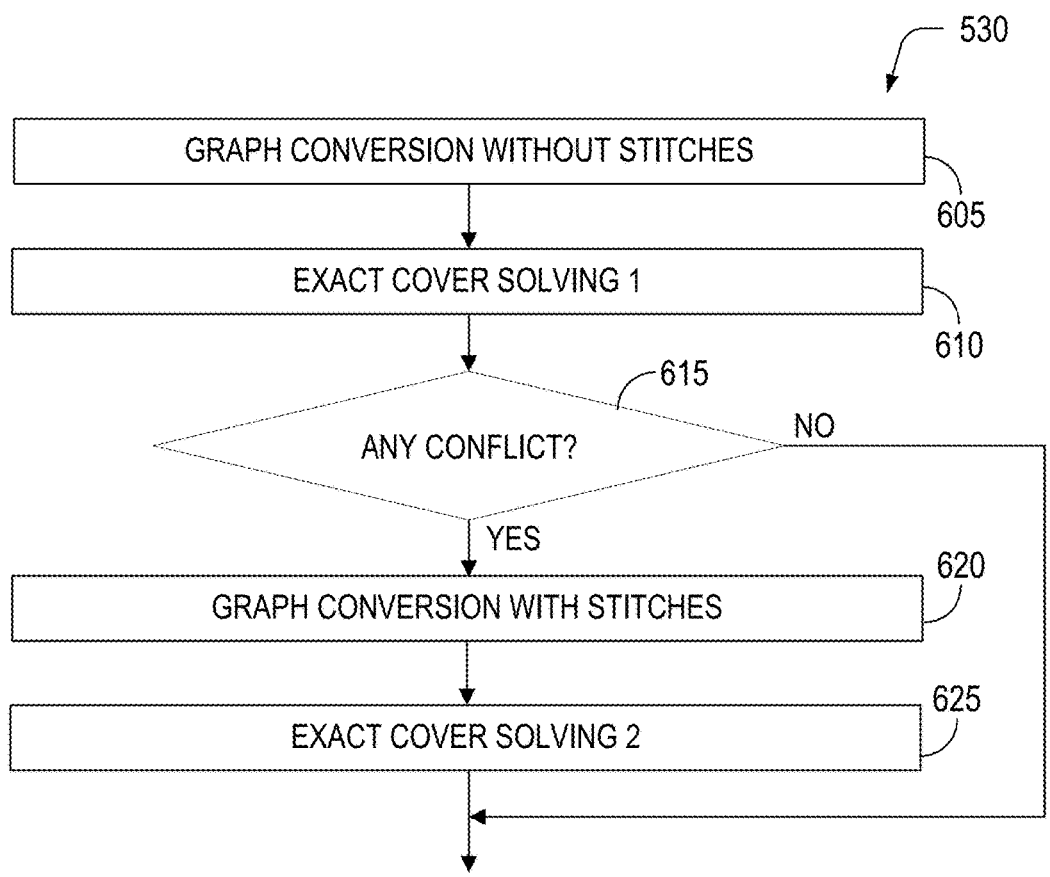
FIG. 6 depicts a simplified exemplary flow chart for determining color assignments for the subgraph as previously depicted in FIG. 5, in accordance with one embodiment of the present invention.

FIG. 6 depicts a simplified exemplary flow chart 530 for determining color assignments for the subgraph as previously depicted in FIG. 5, in accordance with one embodiment of the present invention. As mentioned above, the layout decomposition problem with complex coloring rules is modeled as an exact cover problem. Accordingly, the graph is first converted 605 into exact cover matrix M without stitches as described in reference to FIG. 4. Furthermore, in real practice, many layouts may not successfully be decomposed, and thus detecting conflicts is also important. Hence, the color assignment flow chart 530 contains two passes of exact cover solving.

Referring to FIG. 6, the first pass of exact cover solving 1 610 seeks exact conflicts, while the second pass of exact cover solving 2 620 resolves conflicts with stitch insertion if 615 there are conflicts resulting from the first pass of exact cover solving 1 610. The second pass of exact cover solving 2 620 is done after the graph with stitches (described in reference to FIGS. 12B-12D below) is converted 620 into exact cover matrix M with stitches as described later. The colored subgraph and coloring conflicts if any are output.

Every reported conflict belongs to some un-decomposable conflict graph pattern, e.g., one conflict reported for $K_4$ (clique of degree 4 as in the example described later in reference to FIG. 12A) in TPL. The exact cover solving engine is implemented by augmented Dancing Links plus a proprietary Algorithm X* (augmented DLX). In some embodiments, special treatments are devised based on MPLD properties to speed up the solving time. The approach described in the embodiments is flexible (to consider basic and complex coloring rules simultaneously) and general (to handle arbitrary k masks, such as k≥3 or k≥4).

Details of the color assignment step when only the basic coloring rule is considered and no stitches are used is described next. Stitch handling and complex coloring rule handling will be demonstrated later. Although exact cover is also NP-complete, D. E. Knuth, "Dancing links," Millenial Perspectives in Computer Science, 2000, 187-214, arXiv: cs/0011047 [cs.DS], the contents of all of which is incorporated herein by reference in its entirety, suggested an efficient technique, called Dancing Links data structure plus Algorithm X (DLX), to solve an exact cover problem. For easier visualization, FIG. 7 depicts a triple patterning example with its exact cover matrix, while FIG. 8 illustrates the corresponding Dancing Links.

Figure 7:
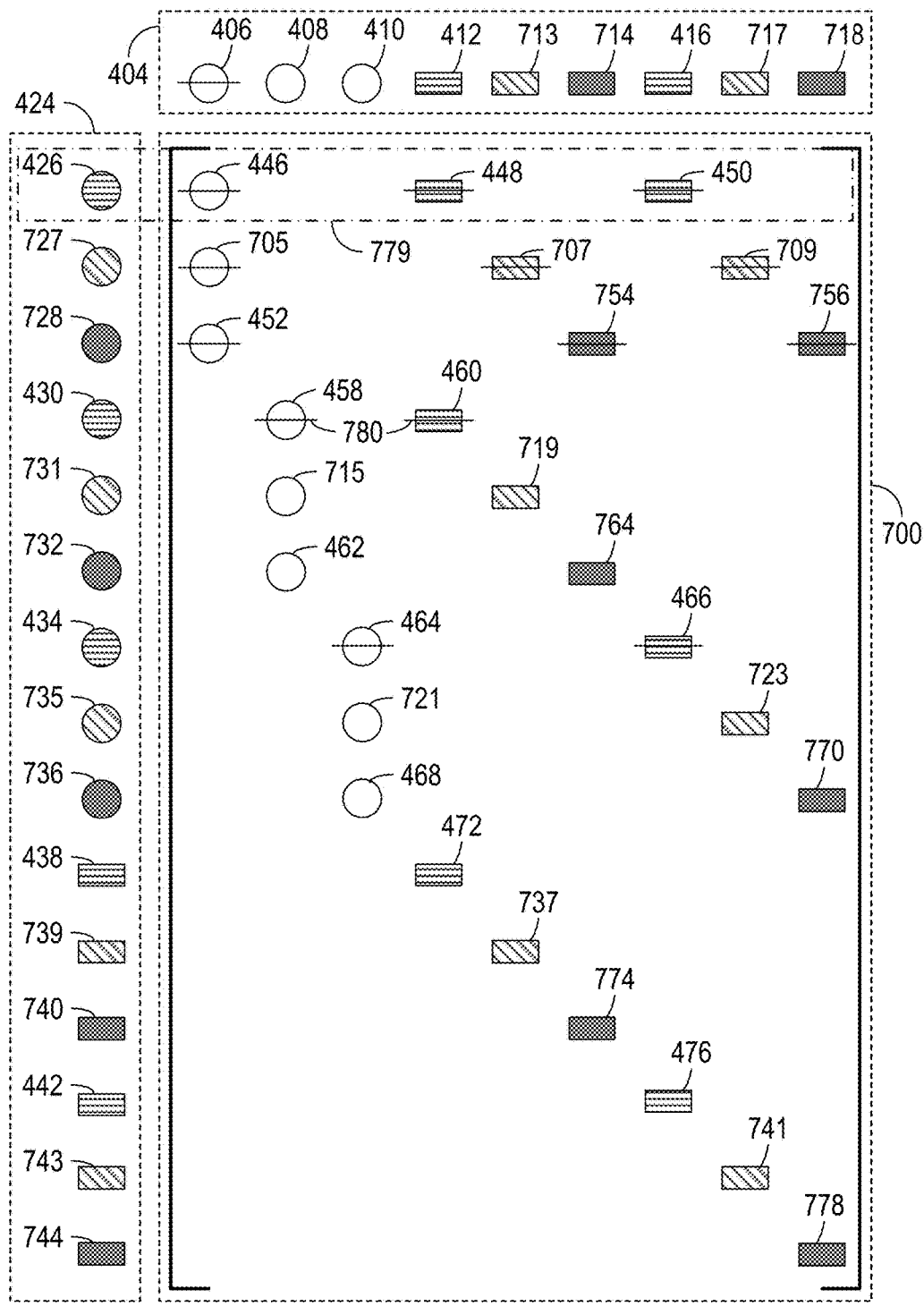
FIG. 7 depicts a simplified exemplary matrix demonstrating the reduction from MPLD of the conflict graph previously depicted in FIG. 3B with the basic coloring rule to exact cover for a triple patterning example, in accordance with one embodiment of the present invention.
Figure 8:
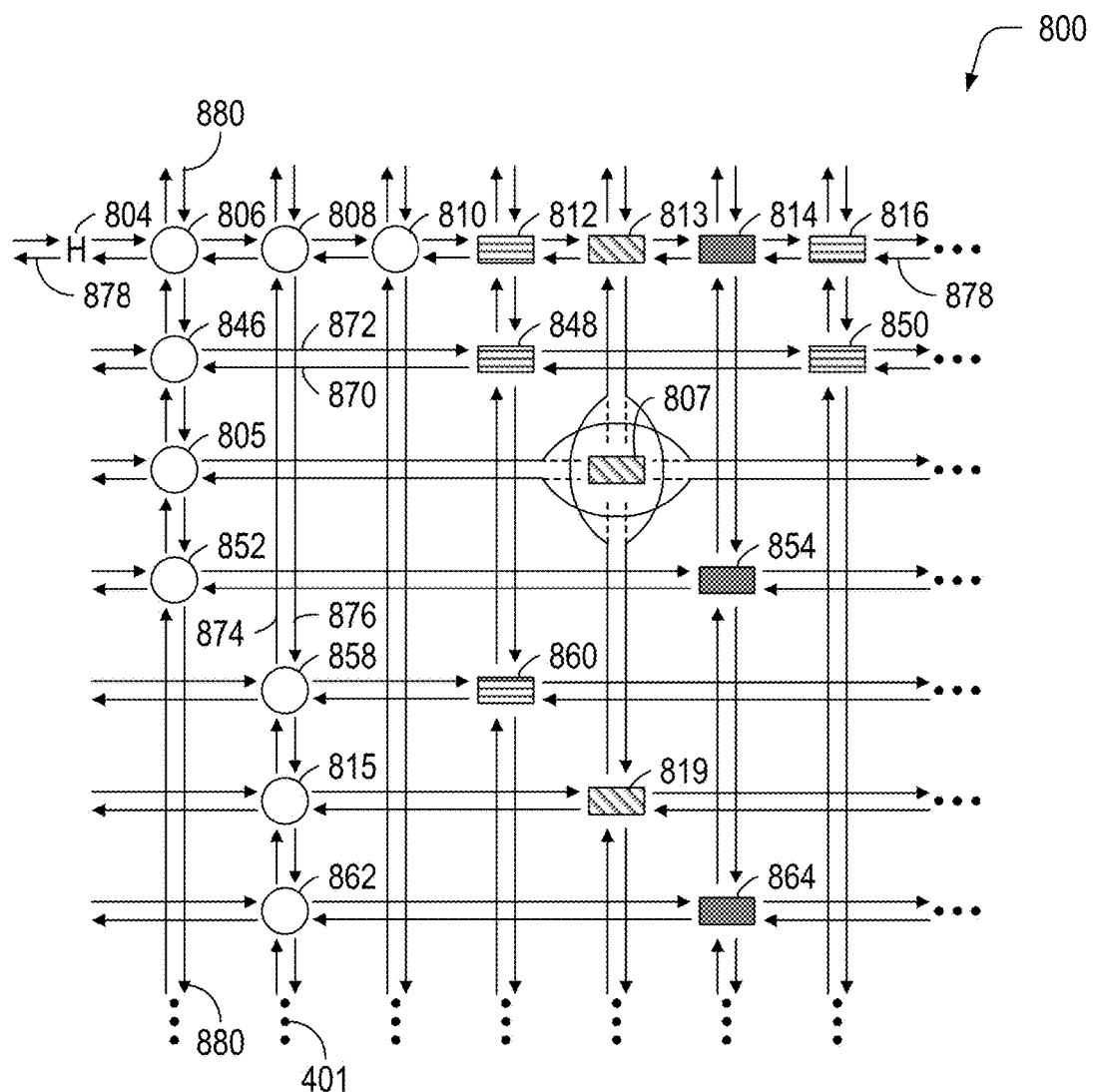
FIG. 8 depicts a simplified exemplary Dancing Links data structure associated with a portion of the matrix previously depicted in FIG. 7, in accordance with one embodiment of the present invention.

FIG. 7 depicts a simplified exemplary a triple patterning example with its exact cover matrix M 700 associated with conflict graph 300B previously depicted in FIG. 3B, in accordance with one embodiment of the present invention. Matrix M 700 has the same functions and elements as Matrix M 400 previously depicted in FIG. 4, except Matrix M 700 is directed specifically to k=3 masks (colors). Accordingly and referring simultaneously to FIGS. 3B, 4 and 7, matrix M 700 includes column 713 associated with edge 334 and mask (color) 2 called $ab^2$ and column 717 associated with edge 336 and mask (color) 2 called $ac^2$. Columns 714, 718 are respectively similar to columns 414, 418 except with k=3 and depicted by solid grey fill pattern for mask (color) 3.

Matrix M 700 further includes row 727, 731, 735 respectively associated with vertices 302, 304, 306 and mask (color) 2. Matrix M 700 further includes singleton rows 739, 743 respectively associated with edges 334 336 and mask (color) 2 and respectively called $ab^2$, $ac^2$. Rows 728, 732, 736, 740, 744 are respectively similar to rows 428, 432, 436, 440, 444 except with k=3 and depicted by solid grey fill pattern for mask (color) 3.

Matrix M 700 further includes a 1 at row/column intersections 705, 707, 709, 715, 719, 721, 723, 737, and 741 all associated with mask (color) 2. Row/column intersections 754, 756, 764, 770, 774, and 778 are respectively similar to row/column intersections 454, 456, 464, 470, 474, and 478 except with k=3 and depicted by solid grey fill pattern for mask (color) 3.

FIG. 8 depicts a simplified exemplary Dancing Links data structure 800 associated with a portion of matrix M 700 previously depicted in FIG. 7, in accordance with one embodiment of the present invention. Referring simultaneously to FIGS. 7 and 8, Dancing Links uses circular doubly-linked lists (toruses) to represent an exact cover matrix. In one embodiment, only 1 s in the matrix are stored in the computer.

Each "1" entry in matrix M 700 corresponds to one node in Dancing Links data structure 800. In other words, Dancing Links data structure 800 includes nodes 846, 848, 850, 805, 807, 852, 854, 858, 860, 815, 819, 862, 864 respectively corresponding to "1s" entries at intersections 446, 448, 450, 705, 707, 452, 754, 458, 460, 715, 719, 462, 764 in matrix M 700. Each node points to its adjacent nodes to the left and right (1's in the same row) as depicted respectively by link arrows 870, 872, up and down (1's in the same column) as depicted respectively by link arrows 874, 876, and the header 804 (e.g. the elements inside box 404) for its column.

Each row and column in matrix M 700 corresponds to the circular doubly-linked list of nodes in Dancing Links data structure 800. The pointing is circular at the ends of the lists in both rows and columns, for example such that link arrow 878 is the same link at the rightmost side of Dancing Links data structure 800 as at the leftmost side. Similarly, link arrow 880 is the same link at the topmost side of Dancing Links data structure 800 as at the bottommost side.

Each column in the matrix has a special header (column node), which is included in the corresponding column list. Column nodes form a special row, including all the columns which still exist in the matrix during exact cover solving. Accordingly, Dancing Links data structure 800 includes nodes 806, 808, 810, 812, 813, 814, 816 respectively corresponding to elements 406, 408, 410, 412, 713, 714, 416 in box 404 associated with matrix M 700.

Because exact cover matrices tend to be sparse, this data structure is usually efficient in both size and processing time. Based on Dancing Links, rows may be quickly selected as possible solutions and efficiently backtracked (undo) for wrong guesses as described below.

Next, the cover and uncover operations used in exact cover solving with Dancing Links are explained. Suppose x points to a node of a doubly-linked list; let L[x] and R[x] point to the left and right of the node. Then, the cover operations L[R[x]]←L[x], R[L[x]]←R[x] remove x from the list. The uncover operations L[R[x]]←x, R[L[x]]←x restore x into the list. Similarly, the cover and uncover operations can be also performed on up and down pointers. As depicted in FIG. 8, node 807 also called $ab^2$ is covered.

Algorithm X is the statement of a trial-and-error approach for finding all solutions to the exact cover problem, and it terminates once no solution can be found. Nevertheless, for MPLD, conflicts for an un-decomposable layout should be detected/reported. Further, Algorithm X is designated to the general exact cover problem. In some embodiments, seven special treatments are devised to reduce the solving time and report all conflicts by utilizing the properties of the MPLD problem.

Figure 9:
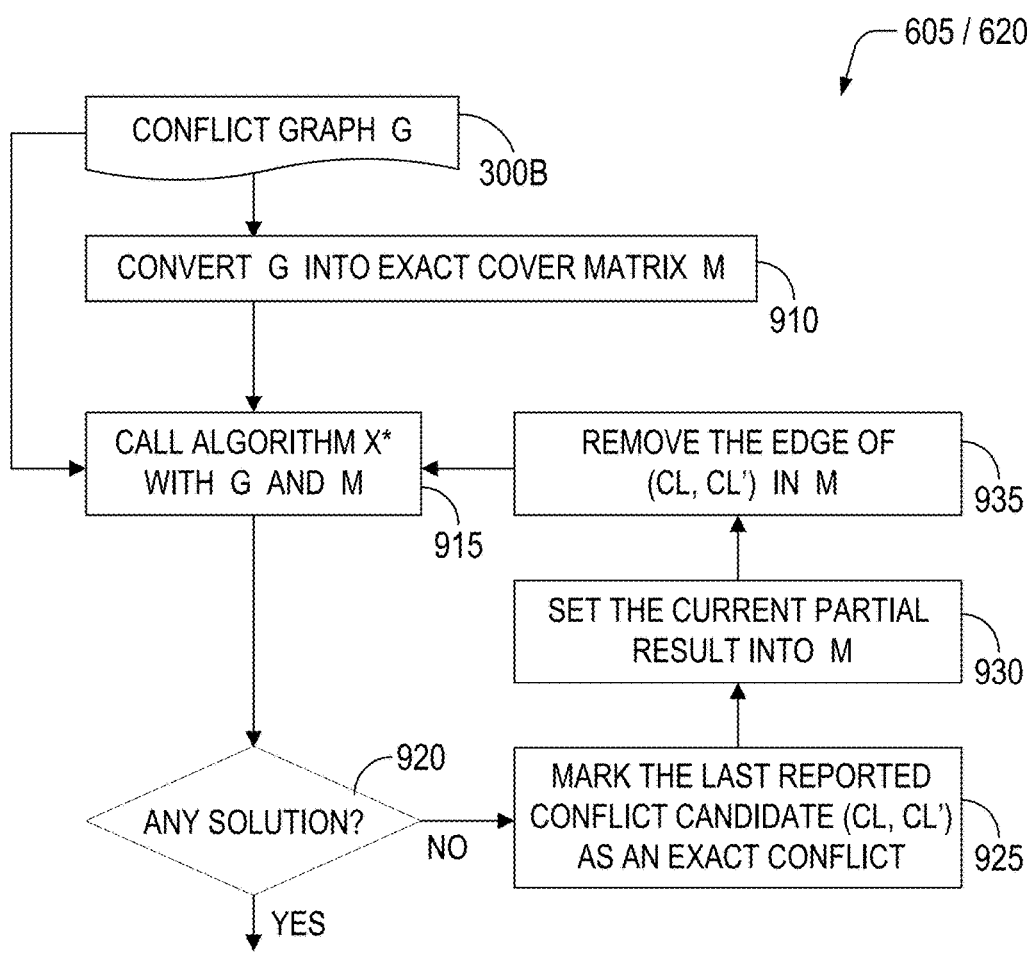
FIG. 9 depicts a simplified exemplary flow chart for exact cover solving as previously depicted in FIG. 6, in accordance with one embodiment of the present invention.

FIG. 9 depicts a simplified exemplary flow chart 605/620 for exact cover solving as previously depicted in FIG. 6, in accordance with one embodiment of the present invention. Referring simultaneously to FIGS. 3B, 7, and 8, flow chart 605/620 depicts the core engine for the procedure of the exact cover solving, which adds a conflict reporting scheme. Flow chart 605/620 includes the following steps. First, an input conflict graph G 300B is converted 910 into exact cover matrix M 700. Then, Algorithm X* is called 915 to solve matrix M 700. If 920 no feasible solution is found by Algorithm X*, the last conflict candidate reported during exact cover solving is marked 925 as an exact conflict. Further, the current partial result is set 930 or recorded in matrix M 700, the corresponding edge of the marked conflict is temporarily removed 935 from matrix M 700 (by cover operations), and exact cover solving continues. This process from steps 915 through 935 is repeated until a feasible solution has been found. This procedure is guaranteed to terminate with a feasible coloring or with conflicts for an un-decomposable layout.

Figure 10:
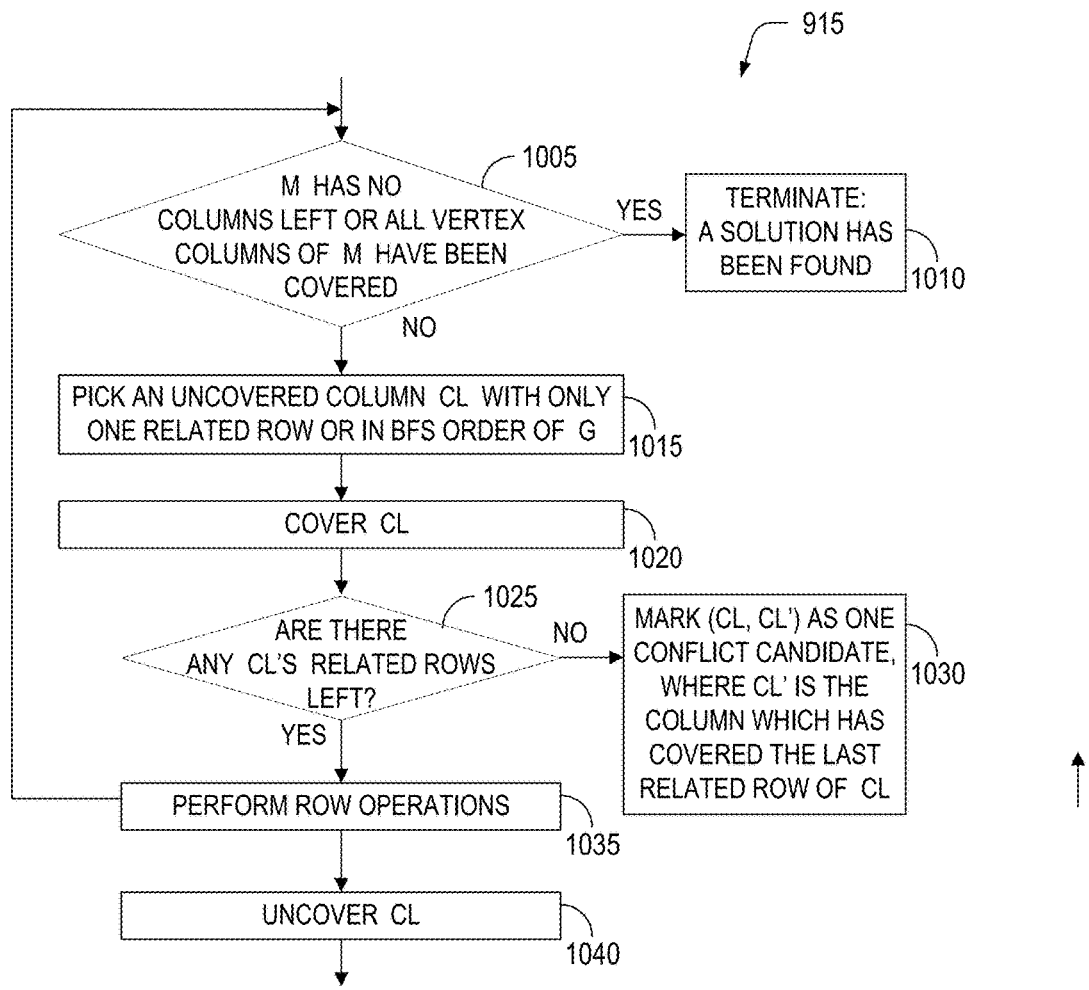
FIG. 10 depicts a simplified exemplary flow chart for Algorithm X* as previously depicted in FIG. 9, in accordance with one embodiment of the present invention.

FIG. 10 depicts a simplified exemplary flow chart 915 for Algorithm X* as previously depicted in FIG. 9, in accordance with one embodiment of the present invention. Flow chart 915 includes the following steps. Referring simultaneously to FIGS. 3B, 7, and 9, flow chart 605/620 depicts first, if 1005 matrix M 700 has no column nodes left or all vertex column nodes (i.e., column nodes corresponding to vertices in G) have been covered, Algorithm X* terminates 1010 with a feasible solution. Otherwise, an uncovered column node cl is selected or picked 1015. The column node selection is in bread-first search (BFS) traversing order of G unless some uncovered column node has only one related row. A related row rw of cl is defined as a row in matrix M that has 1 entry at column cl. Next, the column node cl is covered 1020. Then check if 1025 there are any cl's related rows left. If no such related rows are left then (cl, cl') is marked 1030 as one conflict candidate, where cl' is the column which has covered the last related row of cl. If 1025 no related rows are left, then row operations are performed 1035 from which Algorithm X* is recursively called with current matrix M and conflict graph G. This process continues until a feasible solution has been found or all column nodes and rows are traversed. Finally, column cl is uncovered 1040.

Figure 11:
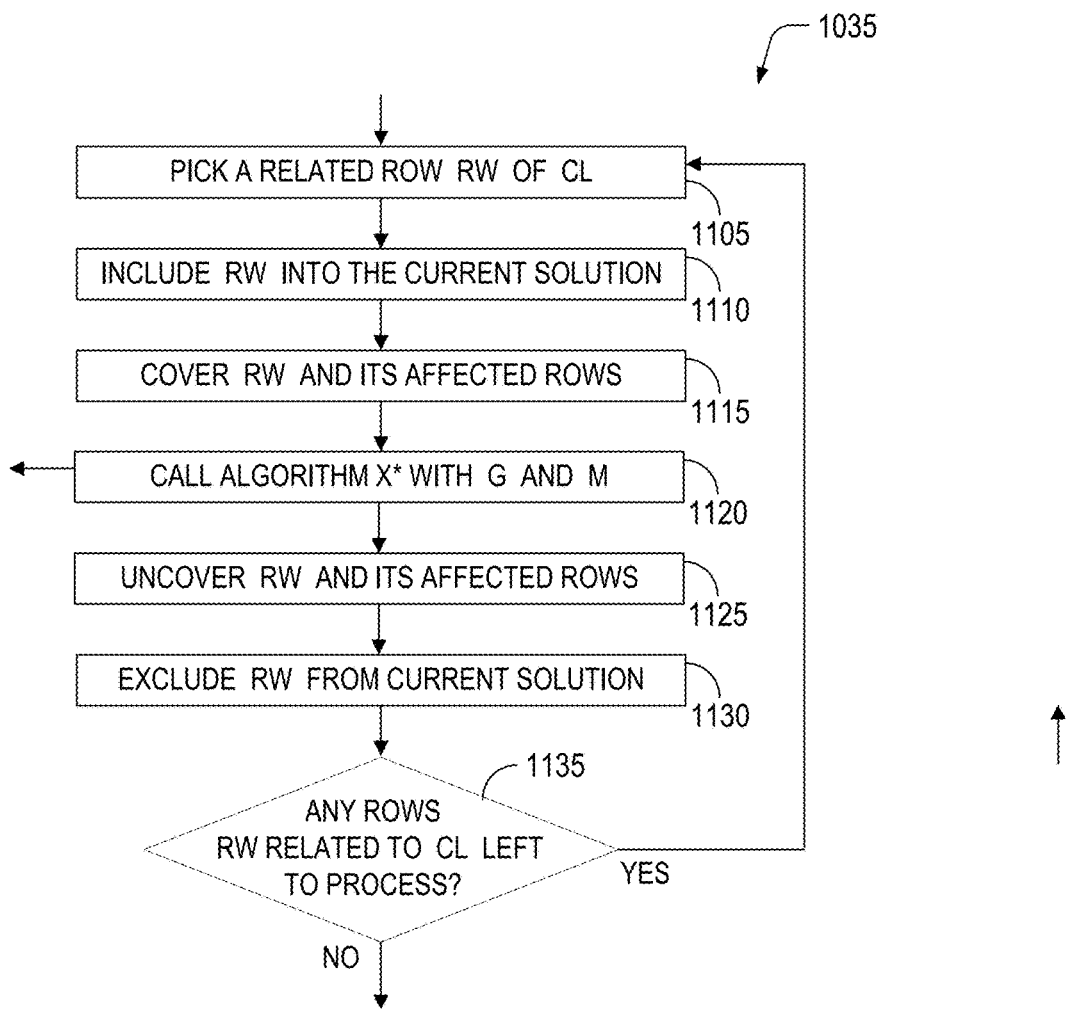
FIG. 11 depicts a simplified exemplary flow chart for performing row operations as previously depicted in FIG. 10, in accordance with one embodiment of the present invention.

FIG. 11 depicts a simplified exemplary flow chart 1035 for performing row operations as previously depicted in FIG. 10, in accordance with one embodiment of the present invention. Flow chart 1035 includes the following steps. A related row rw of cl is picked 1105 into the current partial solution, while nodes on rw and on its affected rows are covered 1115. Algorithm X* is recursively called 1120 with current matrix M and conflict graph G. Related row rw is backtracked by uncovering 1125 rw and its affected rows and excluding 1130 rw from the current solution. The row operations repeat if 1135 there are any rows rw related to cl left to process.

Referring again to FIGS. 7, 9, 10, and 11 as an example, assume the BFS order of G is a, b, c. Step 1015 first selects column node a, and step 1105 first considers the first row 779. Then, step 1110 includes the first row into the solution. Step 1115 covers all nodes at the first, second, third, fourth, and seventh rows of matrix M 700 as depicted by a single short horizontal line 780 depicted across the covered entries 446, 448, 450, 705, 707, 709, 452, 754, 756, 458, 460, 464, 466 of matrix M 700. Later, Algorithm X* picks the fifth row for b and the ninth row for c.

To shorten the exact cover solving time, the following special embodiments based on the properties of the MPLD problem are described. Please note that the first six embodiments do not affect the solution quality. The seventh embodiment is optionally applied on very large conflict graphs.

In a first embodiment, the exact cover solving process is terminated once all vertex column nodes are covered (line 1 in Algorithm X*). Based on the way the exact cover matrix is constructed, once all vertex column nodes are covered, the rest of the uncovered column nodes may easily be covered by singleton rows, and thus the procedure terminates quicker.

In a second embodiment, vertex columns are visited in BFS order, and the vertex of the maximum degree is the root of BFS. Edge columns have lowest priorities (step 1015 in Algorithm X*). Instead of DFS order used in Algorithm X, visiting vertex columns in BFS order may obtain a conflict early if there is no feasible solution.

In a third embodiment, an uncovered column node with only one related row is chosen first (step 1015 in Algorithm X*). The reason is the same as the second embodiment.

In a fourth embodiment, once a conflict is detected, its corresponding edge is removed from matrix M, and the exact cover solving process continues (step 935 in exact cover solver) Originally, Algorithm X terminates if one conflict occurs. In contrast, Algorithm X* attempts to find all conflicts.

In a fifth embodiment, if no feasible solution is found, an exact conflict (cl, cl') is marked, where cl' is the column which has covered the last related row of cl (step 925 in exact cover solver, step 1030 in Algorithm X*). Therefore, false conflict reporting is avoided.

In a sixth embodiment, the procedure continues to find other conflicts or finish the solving from the status where a conflict is reported (step 930 in exact cover solver). To speed up the solving, starting from scratch is avoided after an exact conflict is detected and temporarily removed.

In a seventh embodiment, an early exit heuristic can be applied. When the conflict graph is very large, if some conflict is repeatedly reported over α times, for example α=1000, this conflict may be viewed as an exact conflict, the conflict removed and solution continued. In experiments performed, the early exit heuristic was not applied.

As shown in FIG. 6, the second pass of exact cover solving tries to resolve conflicts found in the first pass by stitch insertion. Different from a known work, which predetermines one stitch candidate for each feature, embodiment of the present invention consider all stitch candidates on features or polygons concurrently.

Figure 12A:
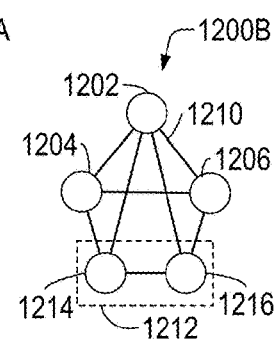
FIG. 12A depicts a simplified exemplary construction of a conflict graph including vertices associated respectively with the polygons previously depicted in FIG. 3A, in accordance with one embodiment of the present invention.

FIG. 12A depicts a simplified exemplary construction of a conflict graph 1200A with $K_4$ (clique of degree 4) for TPL, in accordance with one embodiment of the present invention. Conflict graph 1200A includes verices 1202, 1204, 1206, 1208 respectively named a, b, c, d. Conflict graph 1200A further includes a multitude of edges 1210 called ab, ac, ad, bc, bd, cd such that each vertex is connected through an edge to every other vertex. Conflict graph 1200A is not decomposable into 3 colors and will always produce a conflict result on every TPL coloring attempt. When a subgraph is reported with conflicts such as conflict graph 1200A, the stitch-inserted conflict graph is first constructed for each stitch candidate related to the subgraph.

Figure 12B:
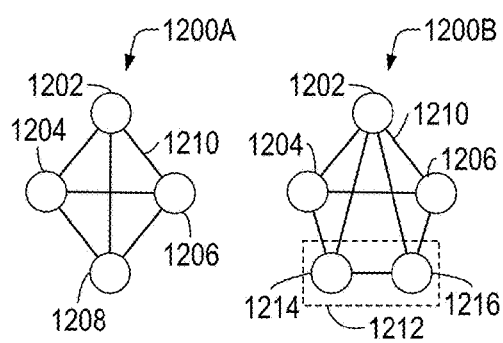
FIG. 12B depicts a simplified exemplary construction of a conflict graph including a first stitch candidate for the conflict graph previously depicted in FIG. 2A, in accordance with one embodiment of the present invention.

FIG. 12B depicts a simplified exemplary construction of a conflict graph 1200B including a first stitch candidate 1212 for conflict graph 1200A previously depicted in FIG. 2A, in accordance with one embodiment of the present invention. Referring simultaneously to FIGS. 12A and 12B, conflict graph 1200B includes the same elements and functions as conflict graph 1200A with the following exceptions. Conflict graph 1200B replaces vertex 1208 with stitch 1212 that includes vertex pair 1214, 1216 respectively called $d_1$, $d_2$. Conflict graph 1200B further includes edge $d_1d_2$ disposed between vertex pair 1214, 1216. Replacing edge ad, conflict graph 1200B further includes edge $ad_1$ disposed between vertex pair 1202, 1214 and edge $ad_2$ disposed between vertex pair 1202, 1214.

Figure 12C:
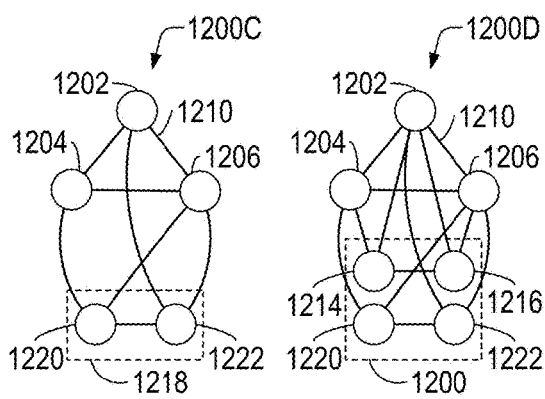
FIG. 12C depicts a simplified exemplary construction of a conflict graph including a second stitch candidate for the conflict graph previously depicted in FIG. 2A, in accordance with one embodiment of the present invention.

FIG. 12C depicts a simplified exemplary construction of a conflict graph 1200C including a second stitch candidate 1218 for conflict graph 1200A previously depicted in FIG. 2A, in accordance with one embodiment of the present invention. Referring simultaneously to FIGS. 12A and 12C, conflict graph 1200C includes the same elements and functions as conflict graph 1200A with the following exceptions. Conflict graph 1200B replaces vertex 1208 with stitch 1218 that includes vertex pair 1220, 1222 respectively called $d_3$, $d_4$. Conflict graph 1200C further includes edge $d_3d_4$ disposed between vertex pair 1220, 1222. Replacing edge ad, conflict graph 1200B further includes edge $ad_4$ disposed between vertex pair 1202, 1222 and edge $cd_3$ disposed between vertex pair 1206, 1220. Then the original conflict graph and all stitch-inserted conflict graphs are combined into one graph, and finally the combined conflict graph is converted into an exact cover matrix and solved by the exact cover solving engine embodiment.

Figure 12D:
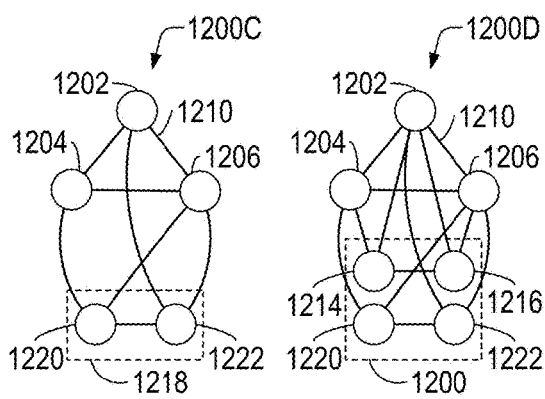
FIG. 12D depicts a simplified exemplary construction of a conflict graph including the summed combination of the original conflict graph, the first stitch-inserted conflict graph and the second stitch-inserted conflict graph previously respectively depicted in FIGS. 12A, 12B, 12C, in accordance with one embodiment of the present invention.

FIG. 12D depicts a simplified exemplary construction of a conflict graph 1200D including the summed combination of the original conflict graph, the first stitch-inserted conflict graph and the second stitch-inserted conflict graph 1200A+1200B+1200C previously respectively depicted in FIGS. 12A, 12B, 12C, in accordance with one embodiment of the present invention.

In the converted matrix with stitch insertion, in addition to the rows generated based on the original conflict graph, extra rows for each stitch candidate are added below the original rows. For each added row, entries are added according to the investigated coloring and edges in the conflict graph.

Figure 13:
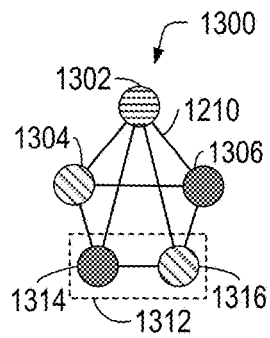
FIG. 13 depicts a simplified exemplary construction of a conflict graph with a stitch after successful 3-coloring of the conflict graph previously depicted in FIG. 12B, in accordance with one embodiment of the present invention.

FIG. 13 depicts a simplified exemplary construction of a conflict graph 1300 with a stitch 1312 after successful 3-coloring of conflict graph 1200B previously depicted in FIG. 12B, in accordance with one embodiment of the present invention. Referring simultaneously to FIGS. 12B and 13, conflict graph 1300 includes the same elements and functions as conflict graph 1200B with the following exceptions. Conflict graph 1300 colors vertices 1202, 1204, 1206, 1214, 1216 with mask 1, mask 2, mask 3, mask 3, mask 2 respectively.

Figure 14:
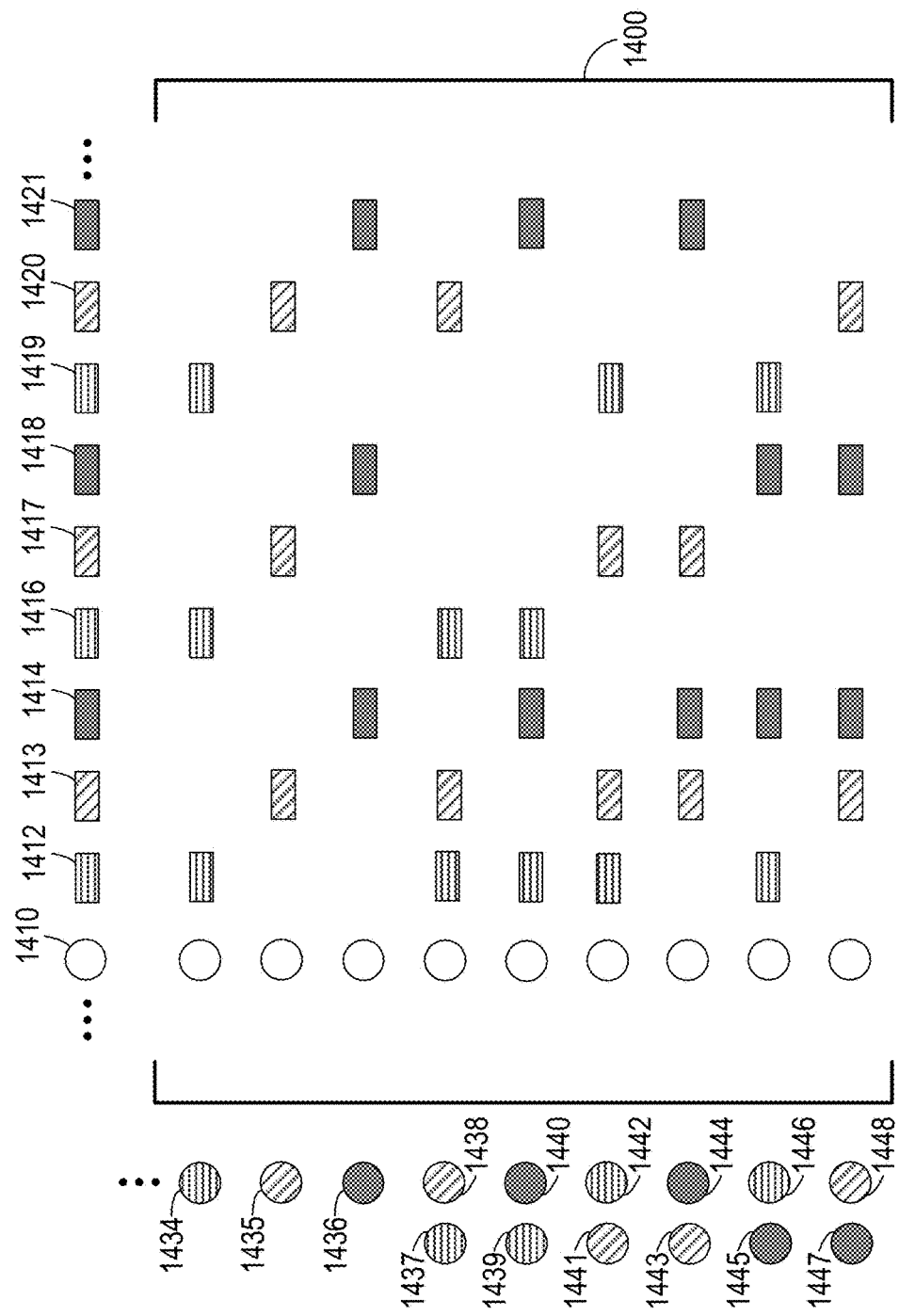
FIG. 14 depicts a simplified exemplary matrix demonstrating the reduction from MPLD of the conflict graph previously depicted in FIG. 13 with the basic coloring rule to exact cover for a triple patterning example with a stitch, in accordance with one embodiment of the present invention.

FIG. 14 depicts a simplified exemplary matrix 1400 demonstrating the reduction from MPLD of conflict graph 1300 previously depicted in FIG. 13 with the basic coloring rule to exact cover for a triple patterning example with stitch 1312 for $d_1$, $d_2$, in accordance with one embodiment of the present invention. It is noted that matrix 1400 is a portion of the larger exact cover matrix of which only a portion is depicted. According to the embodiments described above, matrix 1400 includes column 1410 corresponding to vertex 1208 called d. Matrix 1400 further includes columns 1412 through 1421 corresponding to edges $ad^1$, $ad^2$, $ad^3$, $bd^1$, $bd^2$, $bd^3$, $cd^1$, $cd^2$, $cd^3$ and so on.

FIG. 14 depicts for stitch vertices $d_1$ and $d_2$, there are six possible coloring combinations for TPL, thus creating six corresponding rows. In the row for $d_1$ with mask 1 and $d_2$ with mask 2, entries d, $\{a, d\}^1$ (for $\{a, d_1\}$), $\{a, d\}^2$ (for $\{a, d_2\}$), $\{b, d\}^1$ (for $\{b, d_1\}$), and $\{c, d\}^2$ (for $\{c, d_2\}$) are added. Accordingly, matrix 1400 further includes rows (1437, 1438), (1439, 1440) through (1447, 1448) corresponding respectively with ($d_1$ mask 1, $d_2$ mask 2), ($d_1$ mask 1, $d_2$ mask 3) through ($d_1$ mask 3, $d_2$ mask 2). Further, matrix 1400 includes entries of "1s" as depicted in accordance with the above and identified by their corresponding columns. Similarly, the rows corresponding to $d_3$, $d_4$ can be added.

Please note that all stitch vertices share the same column node (i.e., no extra columns are added). Thus, either the original vertex or one set of stitch vertices may be selected (if this stitch resolves some conflict), and avoids unsafe graph combination. With complex coloring rules, the stitch handling is in the same way.

Figure 15:
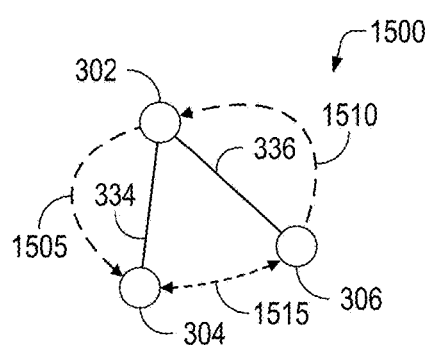
FIG. 15 depicts a simplified exemplary construction of a conflict graph with complex coloring rules added to the conflict graph previously depicted in FIG. 3B, in accordance with one embodiment of the present invention.

FIG. 15 depicts a simplified exemplary construction of a conflict graph 1500 with complex coloring rules added to conflict graph 300B previously depicted in FIG. 3B, in accordance with one embodiment of the present invention. Conflict graph 1500 includes the same elements and functions as conflict graph 300B with the following exceptions. To demonstrate how complex coloring rules may be natively supported by the proposed exact cover solving engine embodiments, two complex coloring rules are introduced here: different color spacing constraint and pre-coloring constraint. Conflict graph 1500 includes edge 1505 called $\{a, b, 1, 2\}$ and edge 1510 called $\{c, a, 1, 2\}$ for different color spacing depicted as unidirectional long dashed arrows. Conflict graph 1500 further includes edge 1515 called $\{b, c\}$ for a pre-coloring constraint depicted as bidirectional short dashed arrow.

Figure 16:
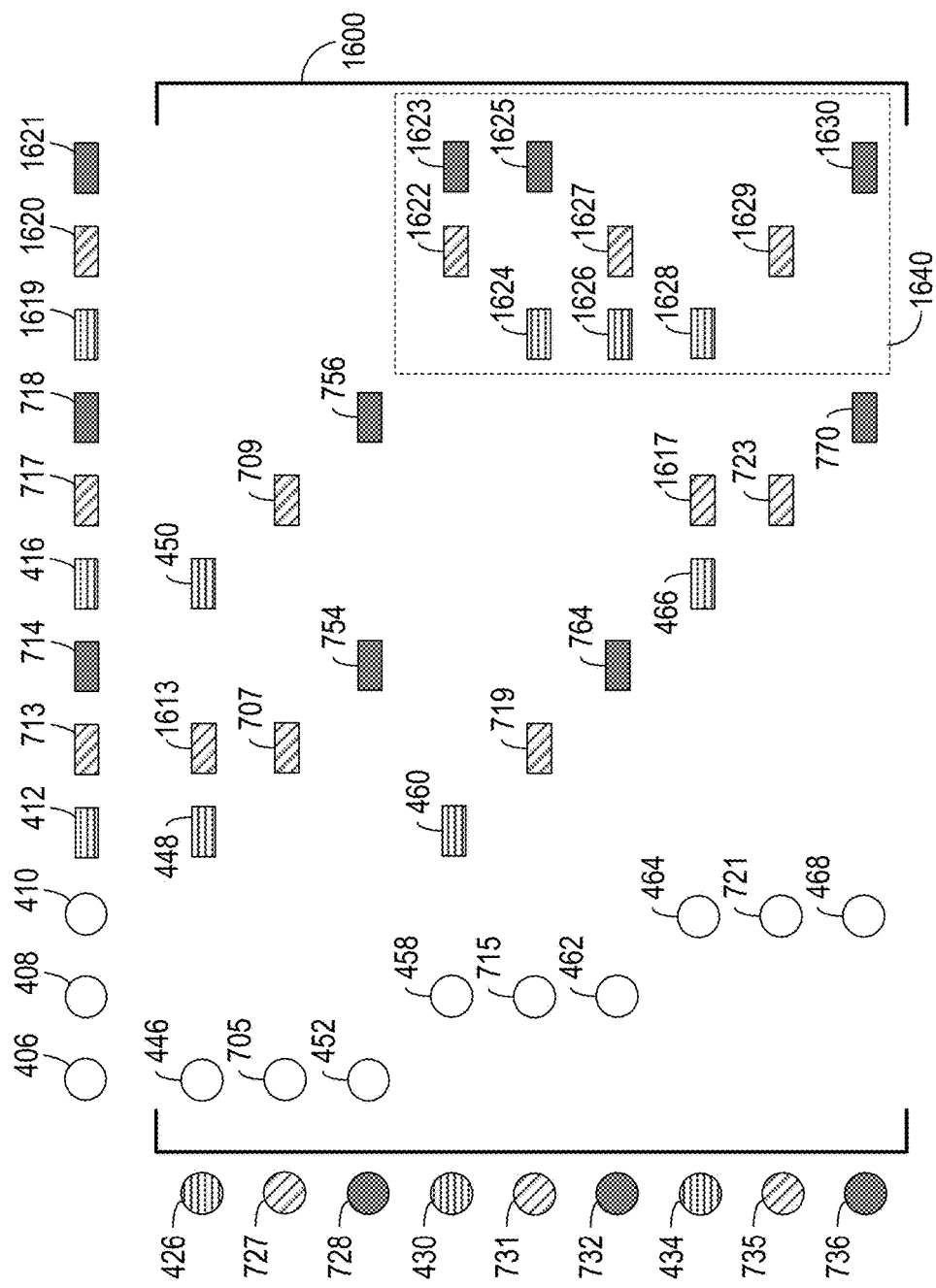
FIG. 16 depicts a simplified exemplary matrix demonstrating the reduction from MPLD of the conflict graph previously depicted in FIG. 15 with complex coloring rules to exact cover for a triple patterning example, in accordance with one embodiment of the present invention.

FIG. 16 depicts a simplified exemplary matrix M 1600 demonstrating the reduction from MPLD of conflict graph 1500 previously depicted in FIG. 15 with complex coloring rules to exact cover for a triple patterning example, in accordance with one embodiment of the present invention. Referring simultaneously to FIGS. 7, 15, and 16, matrix M 1600 includes the same elements and functions as matrix M 700 with the following exceptions. First, the meaning of an undirected conflict edge $\{u, v\}$ is extended to a 4-tuple directed edge $\{u, v, i, j\}$, where $i, j \in \{1, \ldots, k\}$, where edge $\{u, v, i, j\}$ means vertex v cannot be assigned to j when vertex u is assigned to i. For the basic coloring rule, edge $\{u, v\}$ means vertices u and v cannot have the same color, thus corresponding to $\{v, u, i, i\}$ and $\{u, v, i, i\}$ $\forall i \in \{1, \ldots, k\}$. Then, for the conversion of edge $\{u, v, i, j\}$ (under $c_d^{ij}$) into the exact cover matrix, one entry for edge $\{u, v\}$ with mask j is simply added into the row of vertex u in mask i for each edge $\{u, v, i, j\}$. Accordingly, entries of is are included in matrix M 1600 at intersections 1613, 1617 and respectively called $ab^2$, $ac^2$.

Second, because a pre-coloring constraint requests that a set of vertices that share the same color, a pre-coloring constraint never co-exists with different or same color spacing constraints on the same edge. Hence, a negative list to handle pre-coloring constraints is used based on the definition of edge $\{u, v, i, j\}$. A pre-coloring constraint may be represented as $\{u, v, i, j\}$, $\forall i \neq j$, and $\{v, u, i, j\}$, $\forall i \neq j$. Accordingly, matrix M 1600 further includes columns 1619, 1620, 1621 called $bc^1$, $bc^2$, $bc^3$. Matrix M 1600 further includes entries of is at intersections 1622 through 1630 as depicted and highlighted within dashed box 1640. If a pre-coloring constraint is given with a specified color, the rows corresponding to disallowed colors are removed from the matrix. In addition, for the conversion from a pre-coloring constraint into an exact cover matrix, no singleton rows are added for pre-coloring edges.

In one embodiment, the exact cover matrix construction for basic/complex coloring rules and stitch insertion is not limited to any specific number of masks to be used. The embodiment framework is general for k-patterning, for arbitrary k or even k≥4. Results of executed experiments show this capability. The experimental results on benchmark layouts have shown that the approach described by the above embodiments achieved the least conflicts and stitches compared with state-of-the-art works and handled complex coloring rules well.

Figure 17:
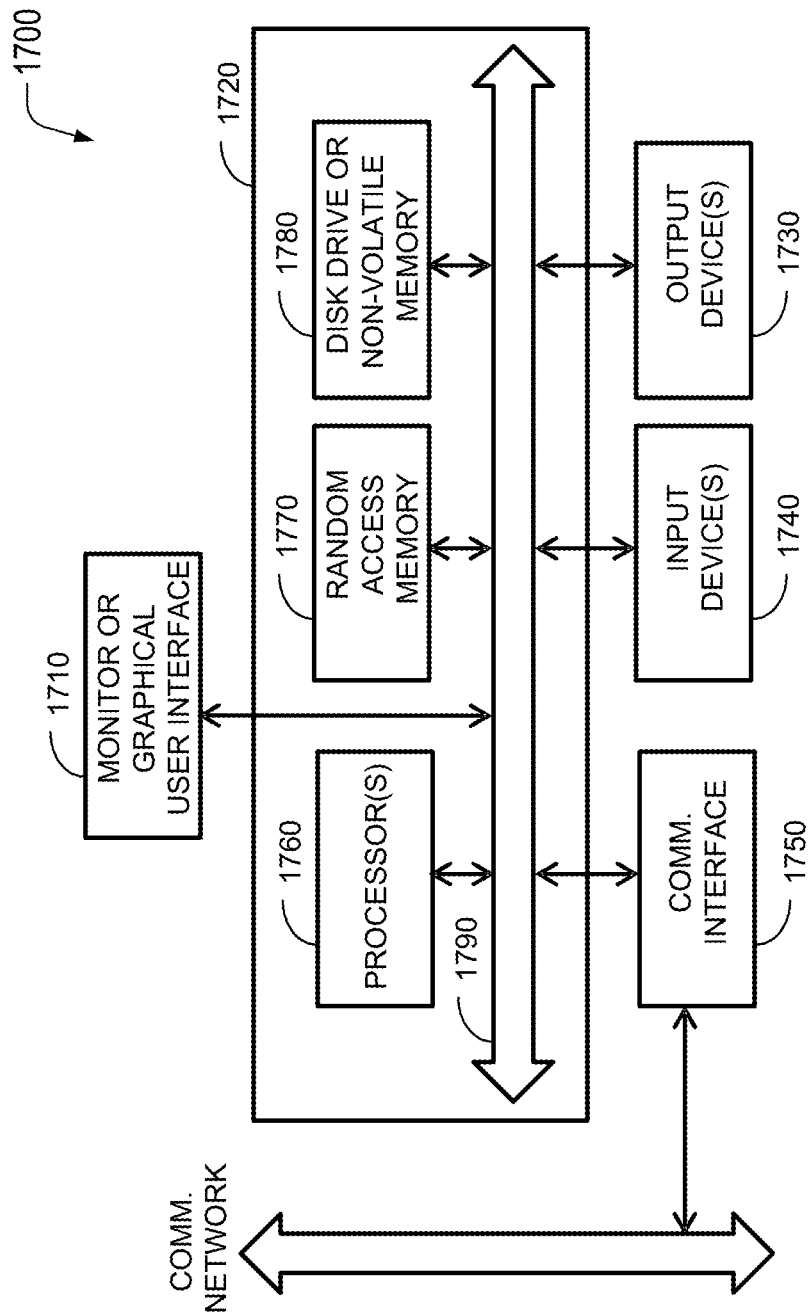
FIG. 17 is a block diagram of a computer system that may incorporate embodiments of the present invention.

FIG. 17 is a block diagram of a computer system that may incorporate embodiments of the present invention. FIG. 17 is merely illustrative of an embodiment incorporating the present invention and does not limit the scope of the invention as recited in the claims. One of ordinary skill in the art would recognize other variations, modifications, and alternatives.

In one embodiment, computer system 1700 typically includes a monitor 1710, a computer 1720, user output devices 1730, user input devices 1740, communications interface 1750, and the like.

As shown in FIG. 17, computer 1720 may include a processor(s) 1760 that communicates with a number of peripheral devices via a bus subsystem 1790. These peripheral devices may include user output devices 1730, user input devices 1740, communications interface 1750, and a storage subsystem, such as random access memory (RAM) 1770 and disk drive 1780.

User input devices 1730 include all possible types of devices and mechanisms for inputting information to computer system 1720. These may include a keyboard, a keypad, a touch screen incorporated into the display, audio input devices such as voice recognition systems, microphones, and other types of input devices. In various embodiments, user input devices 1730 are typically embodied as a computer mouse, a trackball, a track pad, a joystick, wireless remote, drawing tablet, voice command system, eye tracking system, and the like. User input devices 1730 typically allow a user to select objects, icons, text and the like that appear on the monitor 1710 via a command such as a click of a button or the like.

User output devices 1740 include all possible types of devices and mechanisms for outputting information from computer 1720. These may include a display (e.g., monitor 1710), non-visual displays such as audio output devices, etc.

Communications interface 1750 provides an interface to other communication networks and devices. Communications interface 1750 may serve as an interface for receiving data from and transmitting data to other systems. Embodiments of communications interface 1750 typically include an Ethernet card, a modem (telephone, satellite, cable, ISDN), (asynchronous) digital subscriber line (DSL) unit, FireWire interface, USB interface, and the like. For example, communications interface 1750 may be coupled to a computer network, to a FireWire bus, or the like. In other embodiments, communications interfaces 1750 may be physically integrated on the motherboard of computer 1720, and may be a software program, such as soft DSL, or the like.

In various embodiments, computer system 1700 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiment, computer 1720 includes one or more Xeon microprocessors from Intel as processor(s) 1760. Further, one embodiment, computer 1720 includes a UNIX-based operating system.

RAM 1770 and disk drive 1780 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. RAM 1770 and disk drive 1780 may be configured to store the basic programming and data constructs that provide the functionality of the present invention.

Software code modules and instructions that provide the functionality of the present invention may be stored in RAM 1770 and disk drive 1780. These software modules may be executed by processor(s) 1760. RAM 1770 and disk drive 1780 may also provide a repository for storing data used in accordance with the present invention.

RAM 1770 and disk drive 1780 may include a number of memories including a main random access memory (RAM) for storage of instructions and data during program execution and a read only memory (ROM) in which fixed non-transitory instructions are stored. RAM 1770 and disk drive 1780 may include a file storage subsystem providing persistent (non-volatile) storage for program and data files. RAM 1770 and disk drive 1780 may also include removable storage systems, such as removable flash memory.

Bus subsystem 1790 provides a mechanism for letting the various components and subsystems of computer 1720 communicate with each other as intended. Although bus subsystem 1790 is shown schematically as a single bus, alternative embodiments of the bus subsystem may utilize multiple busses.

FIG. 17 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention can be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above embodiments of the present invention are illustrative and not limiting. Various alternatives and equivalents are possible. Although, the invention has been described with reference to a triple-patterning technology using three colors by way of an example, it is understood that the invention is not limited by the triple-patterning technology but may also be applicable to higher than triple-patterning technologies such as technologies using more than three colors during layout decomposition. Although, the invention has been described with reference to the same color spacing constraint and the different color spacing constraints by way of an example, it is understood that the invention is not limited by the number or type of complex coloring rules so long as the layout decomposition may benefit from such other complex coloring rules. In addition, the technique and system of the present invention is suitable for use with a wide variety of electronic design automation (EDA) tools and methodologies for designing, testing, and/or manufacturing systems characterized by a combination of conserved, signal flow, and event or digital system of equations. The scope of the invention should, therefore, be determined not with reference to the above description, but instead should be determined with reference to the pending claims along with their full scope or equivalents.

What is claimed is:

1. A computer implemented method for decomposing a layout of a portion of an integrated circuit, the layout including a first plurality of polygons, the method comprising:

constructing, using the computer, a first matrix representative of a first plurality of constraints, each of the first plurality of constraints being between a different pair of the first plurality of polygons;

solving, using the computer, the first matrix to thereby assign one of a plurality of masks to each different one of the first plurality of polygons, when the computer is invoked to decompose the layout; and characterizing the first matrix by a dimension equal to the sum of a first number and a second number, wherein the first number is equal to a first count of the first plurality of polygons multiplied by a second count of the plurality of masks, wherein the second number is equal to a third count of the first plurality of constraints multiplied by the second count.

2. The computer-implemented method of claim 1, wherein each one of the plurality of masks is associated with multiple patterning lithography.

3. The computer-implemented method of claim 1, wherein each one of the first plurality of constraints causes the pair of the first plurality of polygons to be assigned to different ones of the plurality of masks.

4. The computer-implemented method of claim 1, wherein the layout includes a second plurality of polygons, the method further comprising:
constructing, using the computer, the first matrix representative of a second plurality of constraints, each one of the second plurality of constraints being different from any one of the first plurality of constraints, wherein each one of the second plurality of constraints causes a pair of the second plurality of polygons to be assigned to different ones of the plurality of masks.

5. The computer-implemented method of claim 1, wherein the first matrix is an exact cover matrix.

6. The computer-implemented method of claim 1, wherein the first matrix includes a first plurality of rows and a plurality of columns having a different orientation to the first plurality of rows, wherein one of a plurality of values is associated with an intersection between one of the first plurality of rows and one of the plurality of columns, wherein each of the plurality of values is a logical true value, wherein constructing the first matrix comprises:
constructing a second plurality of rows, wherein the second plurality of rows is a subset of the first plurality of rows such that each one of the second plurality of rows contains exactly one logical true value in each one of the plurality of columns.

7. The computer-implemented method of claim 1 further comprising:
representing, using the computer, the first matrix as a Dancing Links data structure to solve the first matrix.

8. The computer-implemented method of claim 1 further comprising:
forming, using the computer, data representative of a graph associated with the layout, wherein the graph includes a plurality of vertices and a plurality of edges, each one of the plurality of vertices being associated with a different one of the first plurality of polygons, each one of the plurality of edges being associated with a different one of the first plurality of constraints;
transforming, using the computer, the graph into the first matrix, wherein the first matrix includes a first plurality of columns, wherein each one of the first plurality of columns is associated with a different one of the first plurality of polygons; and
visiting, using the computer, the first plurality of columns in a breadth-first search order associated with the graph to solve the first matrix.

9. The computer-implemented method of claim 1, wherein the first matrix includes a first plurality of rows and a plurality of columns having a different orientation to the first plurality of rows, wherein one of a plurality of values is associated with an intersection between one of the first plurality of rows and one of the plurality of columns, wherein each one of the plurality of values is a logical true value, the method further comprising:
first choosing, using the computer, one of the first plurality of columns having exactly one logical true value at the intersection of the chosen one of the first plurality of columns and one of the first plurality of rows to solve the first matrix.

10. The computer-implemented method of claim 1 further comprising:
detecting, using the computer, a first conflict when solving the first matrix provides no feasible solution, wherein the first conflict is one of the first plurality of constraints that prevents assigning one of the plurality of masks to one of the first plurality of polygons;
removing, using the computer, a representation of the first conflict from the first matrix thereby forming a second matrix if the first conflict is detected;
marking, using the computer, the detected first conflict as an exact first conflict;
continuing, using the computer, to solve the second matrix thereby avoiding starting from scratch; and
detecting, using the computer, a second conflict when solving the second matrix provides no feasible solution, wherein the second conflict is one of the first plurality of constraints that prevents assigning one of the plurality of masks to one of the first plurality of polygons.

11. The computer-implemented method of claim 1 further comprising:
stitching, using the computer, at least one of the first plurality of polygons to form a second plurality of polygons when solving the first matrix provides no feasible solution;
constructing, using the computer, a second matrix representative of the first plurality of constraints and a second plurality of constraints, wherein each of the first plurality of constraints is between a different pair of the first plurality of polygons, wherein each of the second plurality of constraints is between a different pair of the second plurality of polygons; and
solving, using the computer, the second matrix to thereby assign one of a plurality of masks to each different one of the first plurality of polygons and to each different one of the second plurality of polygons.

12. The computer-implemented method of claim 1, wherein a count of the plurality of masks is greater than or equal to 3.

13. The computer-implemented method of claim 1, wherein the first plurality of polygons includes a first polygon, a second polygon, and a third polygon, wherein constructing the first matrix further comprises:
associating the first polygon with a first column of the matrix;
associating the second polygon with a second column of the matrix; and
associating the third polygon with a third column of the matrix.

14. The computer-implemented method of claim 13, wherein the first plurality of constraints includes a first constraint between the first polygon and the second polygon, and a second constraint between the first polygon and the third polygon, wherein constructing the first matrix further comprises:
associating a first plurality of columns of the matrix with the first constraint, wherein each one of the first plurality of columns is further associated with a different one of the plurality of masks; and
associating a second plurality of columns of the matrix with the second constraint, wherein each one of the second plurality of columns is further associated with the different one of the plurality of masks.

15. The computer-implemented method of claim 14, wherein constructing the first matrix further comprises:
associating a first plurality of rows of the matrix with the first polygon, wherein each one of the first plurality of rows is further associated with a different one of the plurality of masks;
associating a second plurality of rows of the matrix with the second polygon, wherein each one of the second plurality of rows is further associated with the different one of the plurality of masks;
associating a third plurality of rows of the matrix with the third polygon, wherein each one of the third plurality of rows is further associated with the different one of the plurality of masks;
associating a fourth plurality of rows of the matrix with the first constraint, wherein each one of the fourth plurality of rows is further associated with the different one of the plurality of masks; and
associating a fifth plurality of rows of the matrix with the second constraint, wherein each one of the fifth plurality of rows is further associated with the different one of the plurality of masks.

16. The computer-implemented method of claim 15, wherein a third plurality of columns includes the first column, the second column, the third column, the first plurality of columns, and the second plurality of columns, wherein a sixth plurality of rows includes the first, second, third, fourth, and fifth plurality of rows, wherein constructing the first matrix further comprises:
associating a logical true value at each intersection between one of the sixth plurality of rows and one of the third plurality of columns when the association between one of the sixth plurality of rows and one of the third plurality of columns is true.

17. A non-transitory computer-readable storage medium comprising instructions which when executed by a computer cause the computer to:
construct a first matrix representative of a first plurality of constraints, each of the first plurality of constraints being between a different pair of a first plurality of polygons that are included in a layout of a portion of an integrated circuit;
solve the first matrix to thereby assign one of a plurality of masks to each different one of the first plurality of polygons, when the computer is invoked to decompose the layout; and
characterize the first matrix by a dimension equal to the sum of a first number and a second number, wherein the first number is equal to a first count of the first plurality of polygons multiplied by a second count of the plurality of masks, wherein the second number is equal to a third count of the first plurality of constraints multiplied by the second count.

18. The non-transitory computer-readable storage medium of claim 17, wherein each one of the plurality of masks is associated with multiple patterning lithography.

19. The non-transitory computer-readable storage medium of claim 17, wherein each one of the first plurality of constraints causes the pair of the first plurality of polygons to be assigned to different ones of the plurality of masks.

20. The non-transitory computer-readable storage medium of claim 17, wherein the layout includes a second plurality of polygons, the instructions further causing the computer to:
construct the first matrix representative of a second plurality of constraints, each one of the second plurality of constraints being different from any one of the first plurality of constraints, wherein each one of the second plurality of constraints causes a pair of the second plurality of polygons to be assigned to different ones of the plurality of masks.

21. The non-transitory computer-readable storage medium of claim 17, wherein the first matrix is an exact cover matrix.

22. The non-transitory computer-readable storage medium of claim 17, wherein the first matrix includes a first plurality of rows and a plurality of columns having a different orientation to the first plurality of rows, wherein one of a plurality of values is associated with an intersection between one of the first plurality of rows and one of the plurality of columns, wherein each of the plurality of values is a logical true value, wherein the instructions to construct the first matrix further causing the computer to:
construct a second plurality of rows, wherein the second plurality of rows is a subset of the first plurality of rows such that each one of the second plurality of rows contains exactly one logical true value in each one of the plurality of columns.

23. The non-transitory computer-readable storage medium of claim 17, the instructions further causing the computer to:
represent the first matrix as a Dancing Links data structure to solve the first matrix.

24. The non-transitory computer-readable storage medium of claim 17, the instructions further causing the computer to:
form data representative of a graph associated with the layout, wherein the graph includes a plurality of vertices and a plurality of edges, each one of the plurality of vertices being associated with a different one of the first plurality of polygons, each one of the plurality of edges being associated with a different one of the first plurality of constraints;
transform the graph into the first matrix, wherein the first matrix includes a first plurality of columns, wherein each one of the first plurality of columns is associated with a different one of the first plurality of polygons; and
visit the first plurality of columns in a breadth-first search order associated with the graph to solve the first matrix.

25. The non-transitory computer-readable storage medium of claim 17, wherein the first matrix includes a first plurality of rows and a plurality of columns having a different orientation to the first plurality of rows, wherein one of a plurality of values is associated with an intersection between one of the first plurality of rows and one of the plurality of columns, wherein each one of the plurality of values is a logical true value, the instructions further causing the computer to:
first choose one of the first plurality of columns having exactly one logical true value at the intersection of the chosen one of the first plurality of columns and one of the first plurality of rows to solve the first matrix.

26. The non-transitory computer-readable storage medium of claim 17, the instructions further causing the computer to:
detect a first conflict when solving the first matrix provides no feasible solution, wherein the first conflict is one of the first plurality of constraints that prevents assigning one of the plurality of masks to one of the first plurality of polygons;

remove a representation of the first conflict from the first matrix thereby forming a second matrix if the first conflict is detected;
mark the detected first conflict as an exact first conflict;
continue to solve the second matrix thereby avoiding starting from scratch; and
detect a second conflict when solving the second matrix provides no feasible solution, wherein the second conflict is one of the first plurality of constraints that prevents assigning one of the plurality of masks to one of the first plurality of polygons.

27. The non-transitory computer-readable storage medium of claim 17, the instructions further causing the computer to:
stitch at least one of the first plurality of polygons to form a second plurality of polygons when solving the first matrix provides no feasible solution;
construct a second matrix representative of the first plurality of constraints and a second plurality of constraints, wherein each of the first plurality of constraints is between a different pair of the first plurality of polygons, wherein each of the second plurality of constraints is between a different pair of the second plurality of polygons; and
solve the second matrix to thereby assign one of a plurality of masks to each different one of the first plurality of polygons and to each different one of the second plurality of polygons.

28. The non-transitory computer-readable storage medium of claim 17, wherein a count of the plurality of masks is greater than or equal to 3.

29. The non-transitory computer-readable storage medium of claim 17, wherein the first plurality of polygons includes a first polygon, a second polygon, and a third polygon, wherein the instructions to construct the first matrix further cause the computer to:
associate the first polygon with a first column of the matrix;
associate the second polygon with a second column of the matrix; and
associate the third polygon with a third column of the matrix.

30. The non-transitory computer-readable storage medium of claim 29, wherein the first plurality of constraints includes a first constraint between the first polygon and the second polygon, and a second constraint between the first polygon and the third polygon, wherein the instructions to construct the first matrix further causing the computer to:
associate a first plurality of columns of the matrix with the first constraint, wherein each one of the first plurality of columns is further associated with a different one of the plurality of masks; and
associate a second plurality of columns of the matrix with the second constraint, wherein each one of the second plurality of columns is further associated with the different one of the plurality of masks.

31. The non-transitory computer-readable storage medium of claim 30, wherein the instructions to construct the first matrix further causing the computer to:
associate a first plurality of rows of the matrix with the first polygon, wherein each one of the first plurality of rows is further associated with a different one of the plurality of masks;
associate a second plurality of rows of the matrix with the second polygon, wherein each one of the second plurality of rows is further associated with the different one of the plurality of masks;
associate a third plurality of rows of the matrix with the third polygon, wherein each one of the third plurality of rows is further associated with the different one of the plurality of masks;
associate a fourth plurality of rows of the matrix with the first constraint, wherein each one of the fourth plurality of rows is further associated with the different one of the plurality of masks; and
associate a fifth plurality of rows of the matrix with the second constraint, wherein each one of the fifth plurality of rows is further associated with the different one of the plurality of masks.

32. The non-transitory computer-readable storage medium of claim 31, wherein a third plurality of columns includes the first column, the second column, the third column, the first plurality of columns, and the second plurality of columns, wherein a sixth plurality of rows includes the first, second, third, fourth, and fifth plurality of rows, wherein the instructions to construct the first matrix further causing the computer to:
associate a logical true value at each intersection between one of the sixth plurality of rows and one of the third plurality of columns when the association between one of the sixth plurality of rows and one of the third plurality of columns is true.

33. A system for decomposing a layout of a portion of an integrated circuit, the layout including a first plurality of polygons, the system configured to:
construct a first matrix representative of a first plurality of constraints, each of the first plurality of constraints being between a different pair of the first plurality of polygons;
solve the first matrix to thereby assign one of a plurality of masks to each different one of the first plurality of polygons, when the system is invoked to decompose the layout; and
characterize the first matrix by a dimension equal to the sum of a first number and a second number, wherein the first number is equal to a first count of the first plurality of polygons multiplied by a second count of the plurality of masks, wherein the second number is equal to a third count of the first plurality of constraints multiplied by the second count.

34. The system of claim 33, wherein each one of the plurality of masks is associated with multiple patterning lithography.

35. The system of claim 33, wherein each one of the first plurality of constraints causes the pair of the first plurality of polygons to be assigned to different ones of the plurality of masks.

36. The system of claim 33, wherein the layout includes a second plurality of polygons, the system further configured to:
construct the first matrix representative of a second plurality of constraints, each one of the second plurality of constraints being different from any one of the first plurality of constraints, wherein each one of the second plurality of constraints causes a pair of the second plurality of polygons to be assigned to different ones of the plurality of masks.

37. The system of claim 33, wherein the first matrix is an exact cover matrix.

38. The system of claim 33, wherein the first matrix includes a first plurality of rows and a plurality of columns having a different orientation to the first plurality of rows, wherein one of a plurality of values is associated with an intersection between one of the first plurality of rows and one of the plurality of columns, wherein each of the plurality of values is a logical true value, the system further configured to:

construct a second plurality of rows, wherein the second plurality of rows is a subset of the first plurality of rows such that each one of the second plurality of rows contains exactly one logical true value in each one of the plurality of columns.

39. The system of claim 33 further configured to:
represent the first matrix as a Dancing Links data structure to solve the first matrix.

40. The system of claim 33 further configured to:
form data representative of a graph associated with the layout, wherein the graph includes a plurality of vertices and a plurality of edges, each one of the plurality of vertices being associated with a different one of the first plurality of polygons, each one of the plurality of edges being associated with a different one of the first plurality of constraints;
transform the graph into the first matrix, wherein the first matrix includes a first plurality of columns, wherein each one of the first plurality of columns is associated with a different one of the first plurality of polygons; and
visit the first plurality of columns in a breadth-first search order associated with the graph to solve the first matrix.

41. The system of claim 33, wherein the first matrix includes a first plurality of rows and a plurality of columns having a different orientation to the first plurality of rows, wherein one of a plurality of values is associated with an intersection between one of the first plurality of rows and one of the plurality of columns, wherein each one of the plurality of values is a logical true value, the system further configured to:

first choose one of the first plurality of columns having exactly one logical true value at the intersection of the chosen one of the first plurality of columns and one of the first plurality of rows to solve the first matrix.

42. The system of claim 33 further configured to:
detect a first conflict when solving the first matrix provides no feasible solution, wherein the first conflict is one of the first plurality of constraints that prevents assigning one of the plurality of masks to one of the first plurality of polygons;
remove a representation of the first conflict from the first matrix thereby forming a second matrix if the first conflict is detected;
mark the detected first conflict as an exact first conflict;
continue to solve the second matrix thereby avoiding starting from scratch; and
detect a second conflict when solving the second matrix provides no feasible solution, wherein the second conflict is one of the first plurality of constraints that prevents assigning one of the plurality of masks to one of the first plurality of polygons.

43. The system of claim 33 further configured to:
stitch at least one of the first plurality of polygons to form a second plurality of polygons when solving the first matrix provides no feasible solution;
construct a second matrix representative of the first plurality of constraints and a second plurality of constraints, wherein each of the first plurality of constraints is between a different pair of the first plurality of polygons, wherein each of the second plurality of constraints is between a different pair of the second plurality of polygons; and
solve the second matrix to thereby assign one of a plurality of masks to each different one of the first plurality of polygons and to each different one of the second plurality of polygons.

44. The system of claim 33, wherein a count of the plurality of masks is greater than or equal to 3.

45. The system of claim 33, wherein the first plurality of polygons includes a first polygon, a second polygon, and a third polygon, the system being further configured to:
associate the first polygon with a first column of the matrix;
associate the second polygon with a second column of the matrix; and
associate the third polygon with a third column of the matrix.

46. The system of claim 45, wherein the first plurality of constraints includes a first constraint between the first polygon and the second polygon, and a second constraint between the first polygon and the third polygon, the system further configured to:
associate a first plurality of columns of the matrix with the first constraint, wherein each one of the first plurality of columns is further associated with a different one of the plurality of masks; and
associate a second plurality of columns of the matrix with the second constraint, wherein each one of the second plurality of columns is further associated with the different one of the plurality of masks.

47. The system of claim 46 further configured to:
associate a first plurality of rows of the matrix with the first polygon, wherein each one of the first plurality of rows is further associated with a different one of the plurality of masks;
associate a second plurality of rows of the matrix with the second polygon, wherein each one of the second plurality of rows is further associated with the different one of the plurality of masks;
associate a third plurality of rows of the matrix with the third polygon, wherein each one of the third plurality of rows is further associated with the different one of the plurality of masks;
associate a fourth plurality of rows of the matrix with the first constraint, wherein each one of the fourth plurality of rows is further associated with the different one of the plurality of masks; and
associate a fifth plurality of rows of the matrix with the second constraint, wherein each one of the fifth plurality of rows is further associated with the different one of the plurality of masks.

48. The system of claim 47, wherein a third plurality of columns includes the first column, the second column, the third column, the first plurality of columns, and the second plurality of columns, wherein a sixth plurality of rows includes the first, second, third, fourth, and fifth plurality of rows, the system further configured to:
associate a logical true value at each intersection between one of the sixth plurality of rows and one of the third plurality of columns when the association between one of the sixth plurality of rows and one of the third plurality of columns is true.

* * * * *